US012744651B2

(12) United States Patent
Sakhnini et al.

(10) Patent No.: US 12,744,651 B2
(45) Date of Patent: Sep. 22, 2026

(54) UE INITIATED UPDATE OF ACTIVE TRANSMISSION CONFIGURATION INDICATOR STATES AND SPATIAL RELATION CONFIGURATIONS

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/849,067

(22) Filed: Jun. 24, 2022

(65) Prior Publication Data

US 2023/0421337 A1 Dec. 28, 2023

(51) Int. Cl.
*H04L 5/00* (2006.01)
*H04W 24/08* (2009.01)

(52) U.S. Cl.
CPC .......... *H04L 5/0092* (2013.01); *H04L 5/0058* (2013.01); *H04W 24/08* (2013.01)

(58) Field of Classification Search
CPC .... H04L 5/0092; H04L 5/0058; H04W 24/08; H04B 7/06958; H04B 7/06968; H04B 7/06952
See application file for complete search history.

(56) References Cited

U.S. PATENT DOCUMENTS

2019/0356379 A1 11/2019 Takeda et al.
2020/0288479 A1* 9/2020 Xi .......................... H04B 7/088
2024/0188015 A1* 6/2024 Comsa .............. H04W 56/0045

FOREIGN PATENT DOCUMENTS

WO WO-2023208211 A1 * 11/2023

OTHER PUBLICATIONS

Interdigital: "Remaining Details on enhancements on multi-beam operation", RAN WG1 Meeting #106-e, R1-2106640, e-Meeting, Aug. 16-27, 2021 (Year: 2021).*

(Continued)

*Primary Examiner* — Charles C Jiang
*Assistant Examiner* — Margaret Marie Anderson
(74) *Attorney, Agent, or Firm* — Loza & Loza, LLP/QUALCOMM Incorporated

(57) ABSTRACT

Aspects of the disclosure relate to a device initiating an update of active transmission configuration indicator (TCI) states and/or spatial relation configurations. The device measures one or more signal strengths of one or more network entity transmit beams and activates one or more TCI states/spatial relation configurations corresponding to the one or more network entity transmit beams based on the measured one or more signal strengths. The device further outputs a report indicating the one or more activated TCI states or the one or more activated spatial relation configurations. Thereafter, the device obtains, from a network entity, information indicating a network entity transmit beam corresponding to an activated TCI state or an activated spatial relation configuration and switches, based on the information, to at least one device receive beam that is associated with the indicated network entity transmit beam to communicate signals with the network entity.

32 Claims, 21 Drawing Sheets

(56) References Cited

OTHER PUBLICATIONS

Futurewei: "Enhancement on multi-beam operation", RAN WG1 Meeting #105-e, R1-2104205, e-Meeting, May 19-May 27, 2021 (Year: 2021).*
CATT: "Enhancements on multi-beam operation", R1-2104484, 3GPP TSG RAN WG1 #105-e, e-Meeting, May 19-27, 2021 (Year: 2021).*
Lenovo: "Enhancements on multi-beam operation", RAN WG1 Meeting #105-e, R1-2106666, e-Meeting, Aug. 16-27, 2021 (Year: 2021).*
International Search Report and Written Opinion—PCT/US2023/025133—ISA/EPO—Sep. 11, 2023.
Mediatek Inc: "Enhancement on Multi-Beam Operation", 3GPP TSG RAN WG1 #104b-e, R1-2102675, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 21, 2021, Apr. 7, 2021, XP052177680, 34 Pages, sections 2.1-2.3, figures 5,6, pp. 27-29.
Mediatek Inc: "Enhancement on Multi-Beam Operation", 3GPP TSG RAN WG1 #106-e, R1-2107485, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038400, 37 Pages, Section 2.2.3, 2.1.4, 2.1.5, 2.1.7, 2.3.2, Figure 4, figures 12,13, p. 28-p. 31.
3GPP: "3rd Generation Partnership Project, Technical Specification Group Radio Access Network, NR, Medium Access Control (MAC) Protocol Specification (Release 19)", 3GPP TS 38.321 V19.2.0, Mar. 2026, pp. 1-373, Section 6.1.3.15, Section 6.1.3.14—p. 259, section 6.1.3.18—p. 262.
3GPP: "3rd Generation Partnership Project, Technical Specification Group Radio Access Network, NR, Physical Layer Procedures for Control (Release 19)", 3GPP TS 38.213 V19.3.0, Mar. 2026, pp. 1-331, section 10.1—pp. 181-203, section 9.2.2—pp. 139-140.
3GPP: "3rd Generation Partnership Project, Technical Specification Group Radio Access Network, NR, Physical Layer Procedures for Data Release 19)", 3GPP TS 38.214 V19.3.0, Mar. 2026, pp. 1-357, section 5.1.5—pp. 49-58.

* cited by examiner

One Frame (TDD)
10 ms
subframe
slot
RB
300 subcarrier
OFDM symbol
DMRS R
CSI-RS
330
PDCCH CORESET
SSS
PSS
PDSCH
PBCH
REG 12 REs
1 CCE = 6 REGs
SS/PBCH Block
BWP
20 RBs
channel bandwidth RBs

350

SRS
SRS Comb 0
SRS Comb 1
380
PUCCH
PUSCH

1400

START

1402
Measure, via one or more device receive beams, one or more signal strengths of one or more network entity transmit beams of a plurality of network entity transmit beams 1404
Activate one or more transmission configuration indicator (TCI) states or one or more spatial relation configurations corresponding to the one or more network entity transmit beams based on the measured one or more signal strengths 1406
Output a report indicating the one or more activated TCI states or the one or more activated spatial relation configurations

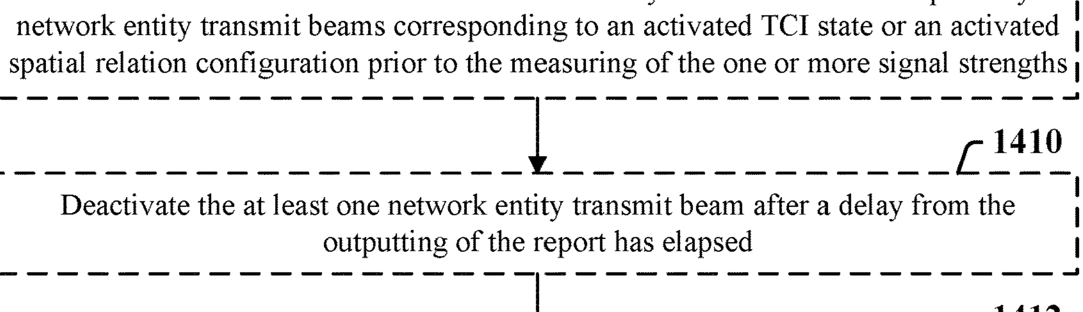

1412
Obtain, from a network entity, information indicating a network entity transmit beam of the one or more network entity transmit beams corresponding to an activated TCI state or an activated spatial relation configuration 1414
Switch, based on the information, to at least one device receive beam of the one or more device receive beams that is associated with the indicated network entity transmit beam to communicate signals with the network entity

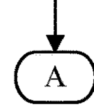

FIG. 14A

UE INITIATED UPDATE OF ACTIVE TRANSMISSION CONFIGURATION INDICATOR STATES AND SPATIAL RELATION CONFIGURATIONS

INTRODUCTION

The present disclosure relates generally to communication systems, and more particularly, to updating uplink control spatial relation information to facilitate uplink control transmission on various component carriers.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPS), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example telecommunication is 5G new radio (NR). 5G NR is part of a continuous mobile broadband evolution promulgated by Third Generation Partnership Project (3GPP) to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a form as a prelude to the more detailed description that is presented later.

In one example, a method of wireless communication at device is disclosed. The method includes measuring, via one or more device receive beams, one or more signal strengths of one or more network entity transmit beams of a plurality of network entity transmit beams, activating one or more transmission configuration indicator (TCI) states or one or more spatial relation configurations corresponding to the one or more network entity transmit beams based on the measured one or more signal strengths, and outputting a report indicating the one or more activated TCI states or the one or more activated spatial relation configurations.

In another example, a device for wireless communication is disclosed. The device includes at least one processor and a memory coupled to the at least one processor. The at least one processor and the memory are configured to measure, via one or more device receive beams, one or more signal strengths of one or more network entity transmit beams of a plurality of network entity transmit beams, activate one or more transmission configuration indicator (TCI) states or one or more spatial relation configurations corresponding to the one or more network entity transmit beams based on the measured one or more signal strengths, and output a report indicating the one or more activated TCI states or the one or more activated spatial relation configurations.

In a further example, a device for wireless communication is disclosed. The device includes means for measuring, via one or more device receive beams, one or more signal strengths of one or more network entity transmit beams of a plurality of network entity transmit beams, means for activating one or more transmission configuration indicator (TCI) states or one or more spatial relation configurations corresponding to the one or more network entity transmit beams based on the measured one or more signal strengths, and means for outputting a report indicating the one or more activated TCI states or the one or more activated spatial relation configurations.

In another example, a non-transitory computer-readable medium storing computer-executable code at a device for wireless communication is disclosed. The non-transitory computer-readable medium includes code for causing a computer to measure, via one or more device receive beams, one or more signal strengths of one or more network entity transmit beams of a plurality of network entity transmit beams, activate one or more transmission configuration indicator (TCI) states or one or more spatial relation configurations corresponding to the one or more network entity transmit beams based on the measured one or more signal strengths, and output a report indicating the one or more activated TCI states or the one or more activated spatial relation configurations.

In a further example, a method of wireless communication at a network entity is disclosed. The method includes outputting a plurality of network entity transmit beams, obtaining a report indicating one or more transmission configuration indicator (TCI) states or one or more spatial relation configurations corresponding to one or more network entity transmit beams of the plurality of network entity transmit beams, and activating the one or more TCI states or the one or more spatial relation configurations corresponding to the one or more network entity transmit beams.

In another example, a network entity for wireless communication is disclosed. The network entity includes at least one processor and a memory coupled to the at least one processor. The at least one processor and the memory are configured to output a plurality of network entity transmit beams, obtain a report indicating one or more transmission configuration indicator (TCI) states or one or more spatial relation configurations corresponding to one or more network entity transmit beams of the plurality of network entity transmit beams, and activate the one or more TCI states or the one or more spatial relation configurations corresponding to the one or more network entity transmit beams.

In a further example, a network entity for wireless communication is disclosed. The network entity includes means for outputting a plurality of network entity transmit beams, means for obtaining a report indicating one or more transmission configuration indicator (TCI) states or one or more spatial relation configurations corresponding to one or more network entity transmit beams of the plurality of network entity transmit beams, and means for activating the one or more TCI states or the one or more spatial relation configurations corresponding to the one or more network entity transmit beams.

In another example, a non-transitory computer-readable medium storing computer-executable code at a network entity for wireless communication is disclosed. The non-transitory computer-readable medium includes code for causing a computer to output a plurality of network entity transmit beams, obtain a report indicating one or more transmission configuration indicator (TCI) states or one or more spatial relation configurations corresponding to one or more network entity transmit beams of the plurality of network entity transmit beams, and activate the one or more TCI states or the one or more spatial relation configurations corresponding to the one or more network entity transmit beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 14A and 14B illustrate a flow chart of an exemplary process for a device initiated update of active transmission configuration indicator (TCI) states and/or spatial relation configurations in accordance with one or more aspects of the present disclosure.

DETAILED DESCRIPTION

Figure 1:
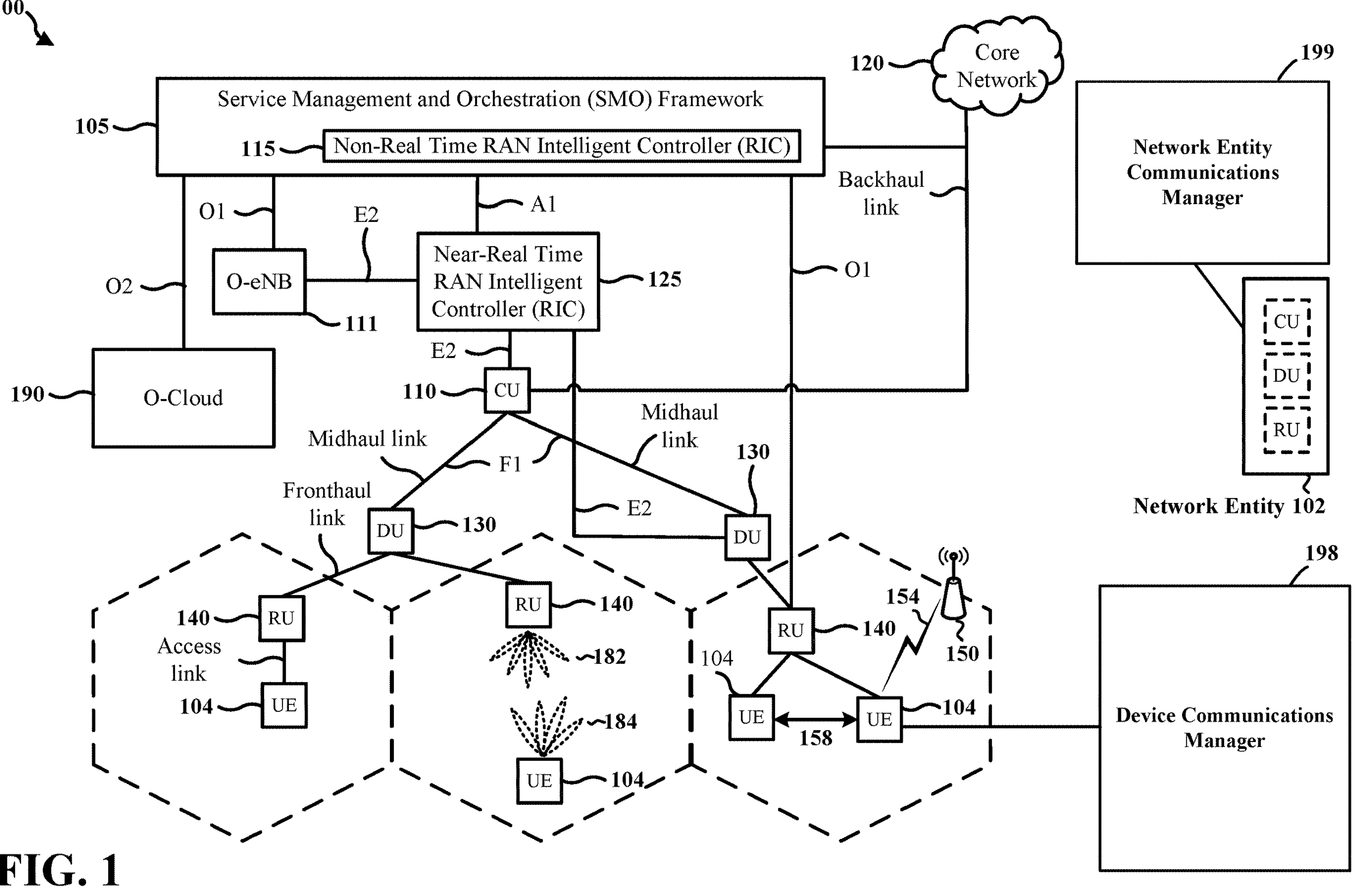
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Beamforming is a signal processing technique that may be used at a transmitter or receiver to shape or steer an antenna beam (e.g., a transmit beam or receive beam) along a spatial path between the transmitter and the receiver. Beamforming may be achieved by combining the signals communicated via antennas such that some of the signals experience constructive interference while others experience destructive interference. Beamforming technology may use beam management procedures, such as beam measurements and beam switches, to maintain a quality of a link between a network entity and a UE at a sufficient level. Beam management procedures aim to support mobility and the selection of the best beam pairing (or beam pair link (BPL)) between the network entity and the UE. Beam selection may be based on a number of considerations including logical state, power saving, robustness, mobility, throughput, etc.

A transmission configuration indication (TCI) state is used to establish a quasi-colocation (QCL) connection between target reference signals and source reference signals. Two antenna ports are considered to be quasi-colocated (QCL'd) if properties of the channel over which a symbol on one antenna port is conveyed can be inferred from the channel over which a symbol on the other antenna port is conveyed. The TCI state may include parameters for configuring a QCL relationship between one or two downlink reference signals and the demodulation reference signals (DM-RS) ports of a physical downlink shared channel (PDSCH), the DM-RS ports of a physical downlink control channel (PDCCH), or the channel state information reference signals (CSI-RS) port(s) of a CSI-RS resource.

While QCL may refer to a relationship between two different downlink reference signals from a UE perspective, the term "spatial relation" may be used to refer to a relationship between an uplink reference signal (e.g., PUCCH/PUSCH DM-RS) and another reference signal from a UE perspective. The other reference signal can either be a downlink reference signal (e.g., CSI-RS or synchronization signal block (SSB)) or an uplink reference signal (e.g., sounding reference signals (SRS)). In an example, if the uplink reference signal is spatially related to a downlink reference signal, it means that the UE should transmit the uplink reference signal in the opposite (reciprocal) direction from which it previously received the downlink reference signal. A spatial relation configuration may include parameters for configuring a beam direction in which the uplink reference signal is transmitted.

A network entity (e.g., gNE) may configure a UE with TCI states and/or spatial relation configurations. The network entity may also activate (select to enable) a subset of the configured TCI states or spatial relation configurations by sending an activation command (e.g., MAC-CE or DCI) to the UE. After sending the activation command, the network entity may receive an acknowledgment (e.g., HARQ ACK) from the UE indicating successful receipt of the activation command, and thereafter, wait a predefined period of time (e.g., 3 ms) before communicating (e.g., performing PDCCH, PDSCH, or PUCCH communication) with the UE via the subset of the configured TCI states or spatial relation configurations. Accordingly, because the network entity controls the selection of TCI states or spatial relation configurations to activate (e.g., enable), latency and overhead is increased due to the necessary exchange of messages (e.g., activation command and HARQ ACK) between the network entity and the UE as well as the required wait time (e.g., 3 ms) before communication according to an activated TCI state or spatial relation configuration can begin. In an aspect, the selection of the TCI states and/or spatial relation configurations to activate (e.g., enable) may be improved by allowing the UE to initiate the selection. For example, using beam management procedures known to the UE, the UE may be in a better position to assess a quality of signaling from the network entity (e.g., by measuring the signal strengths of network entity transmit beams during downlink communication). Thus, the UE can initiate the TCI state/spatial relation configuration selection/activation process by autonomously measuring (e.g., without being prompted by the network entity) the signal strengths of the network entity transmit beams and reporting the measured signal strengths to the network entity to indicate which TCI states/spatial relation configurations to activate. This process promotes system efficiency and reduces latency and overhead. For example, latency and overhead are reduced by eliminating the need to exchange unnecessary messages (e.g., activation command and HARQ ACK) between the network entity and the UE and also by eliminating the required wait time (e.g., 3 ms) before communication based on an activated TCI state or spatial relation configuration can begin. Aspects of the present disclosure relate to the UE initiating/determining active TCI states and/or spatial relation configurations.

Aspects of the disclosure provide for a method, an apparatus, and a computer-readable medium facilitating a device to initiate an update of active transmission configuration indicator (TCI) states and/or spatial relation configurations. For example, a device (e.g., UE) may measure, via one or more device receive beams, one or more signal strengths of one or more network entity transmit beams of a plurality of network entity transmit beams. The device may then activate one or more TCI states or one or more spatial relation configurations corresponding to the one or more network entity transmit beams based on the measured one or more signal strengths. The device may further output a report indicating the one or more activated TCI states or the one or more activated spatial relation configurations. Thereafter, the device may obtain, from a network entity, information indicating a network entity transmit beam of the one or more network entity transmit beams corresponding to an activated TCI state or an activated spatial relation configuration and switch, based on the information, to at least one device receive beam of the one or more device receive beams that is associated with the indicated network entity transmit beam to communicate signals with the network entity. According to one example, the device performing the above operation promotes system efficiency as the operation allows the device to select a TCI state or spatial relation configuration for activation without being prompted by the network entity. This reduces latency and overhead as the need to communicate certain messages (e.g., device receiving activation command and device sending HARQ ACK) and the wait time (e.g., 3 ms) required before beginning communication via the activated TCI state/spatial relation configuration is no longer necessary.

In another example, a network entity (e.g., gNB, CU, DU, or RU) may output a plurality of network entity transmit beams. The network entity may also obtain a report indicating one or more transmission configuration indicator (TCI) states or one or more spatial relation configurations corresponding to one or more network entity transmit beams of the plurality of network entity transmit beams. The network entity may then activate the one or more TCI states or the one or more spatial relation configurations corresponding to the one or more network entity transmit beams. Thereafter, the network entity may provide, to a device, information indicating a network entity transmit beam of the one or more network entity transmit beams corresponding to an activated TCI state or an activated spatial relation configuration and switch to the indicated network entity transmit beam to communicate signals with the device. Accordingly, the network entity performing the above operation promotes system efficiency as the operation allows the network entity to learn of a TCI state or spatial relation configuration to activate from the UE without having to prompt the UE for such information. This reduces latency and overhead as the need to communicate certain messages (e.g., network entity sending activation command and network entity receiving HARQ ACK) and the wait time (e.g., 3 ms) required before beginning communication via the activated TCI state/spatial relation configuration is no longer necessary.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a network entity (such as a Node B (NB), evolved NB (eNB), NR BS, 5G NB, access point (AP), a transmit receive point (TRP), or a cell, etc.) may be implemented as an aggregated network entity (also known as a standalone network entity or a monolithic network entity) or disaggregated network entity.

An aggregated network entity may be configured to utilize a radio protocol stack that is physically or logically integrated within a single RAN node. A disaggregated network entity may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Network entity operation or network design may consider aggregation characteristics of network entity functionality. For example, disaggregated network entities may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated network entity, or disaggregated RAN architecture, can be configured for wired or wireless communication with at least one other unit.

FIG. 1 is a diagram 100 illustrating an example of a wireless communications system and an access network. The illustrated wireless communications system includes a disaggregated network entity architecture. The disaggregated network entity architecture may include one or more CUs 110 that can communicate directly with a core network 120 via a backhaul link, or indirectly with the core network 120 through one or more disaggregated network entity units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more network entity functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML: models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 305 (such as reconfiguration via O1) or via creation of RAN management policies (such as A1 policies).

At least one of the CU 110, the DU 130, and the RU 140 may be referred to as a network entity 102. Accordingly, a network entity 102 may include one or more of the CU 110, the DU 130, and the RU 140 (each component indicated with dotted lines to signify that each component may or may not be included in the network entity 102). The network entity 102 provides an access point to the core network 120 for a UE 104. The network entity 102 may include macrocells (high power cellular base station) and/or small cells (low power cellular base station). The small cells include femtocells, picocells, and microcells. The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers.

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The network entity 102 and the UE 104 may each include a plurality of antennas, such as antenna elements, antenna panels, and/or antenna arrays to facilitate beamforming. The network entity 102 may transmit a beamformed signal 182 to the UE 104 in one or more transmit directions. The UE 104 may receive the beamformed signal from the network entity 102 in one or more receive directions. The UE 104 may also transmit a beamformed signal 184 to the network entity 102 in one or more transmit directions. The network entity 102 may receive the beamformed signal from the UE 104 in one or more receive directions. The network entity 102/UE 104 may perform beam training to determine the best receive and transmit directions for each of the network entity 102/UE 104. The transmit and receive directions for the network entity 102 may or may not be the same. The transmit and receive directions for the UE 104 may or may not be the same.

The network entity 102 may include and/or be referred to as a base station, gNB, Node B, eNB, an access point, a base transceiver station, a radio base station, a radio transceiver, a transceiver function, a basic service set (BSS), an extended service set (ESS), a transmit reception point (TRP), network node, network equipment, or some other suitable terminology. The network entity 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or au RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a device, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a device communications manager 198 that may be configured to measure, via one or more device receive beams, one or more signal strengths of one or more network entity transmit beams of a plurality of network entity transmit beams, activate one or more transmission configuration indicator (TCI) states or one or more spatial relation configurations corresponding to the one or more network entity transmit beams based on the measured one or more signal strengths, and output a report indicating the one or more activated TCI states or the one or more activated spatial relation configurations. The device communications manager 198 may further be configured to obtain, from a network entity, information indicating a network entity transmit beam of the one or more network entity transmit beams corresponding to an activated TCI state or an activated spatial relation configuration, and switch, based on the information, to at least one device receive beam of the one or more device receive beams that is associated with the indicated network entity transmit beam to communicate signals with the network entity.

In certain aspects, the network entity 102 may include a network entity communications manager 199 that may be configured to output a plurality of network entity transmit beams, obtain a report indicating one or more transmission configuration indicator (TCI) states or one or more spatial relation configurations corresponding to one or more network entity transmit beams of the plurality of network entity transmit beams and activate the one or more TCI states or the one or more spatial relation configurations corresponding to the one or more network entity transmit beams. The network entity communications manager 199 may further be configured to provide, to a device, information indicating a network entity transmit beam of the one or more network entity transmit beams corresponding to an activated TCI state or an activated spatial relation configuration, and switch to the indicated network entity transmit beam to communicate signals with the device. Although the following description may be focused on 5G NR, the concepts described herein may be applicable to other similar areas, such as LTE, LTE-A, CDMA, GSM, and other wireless technologies.

Figure 2:
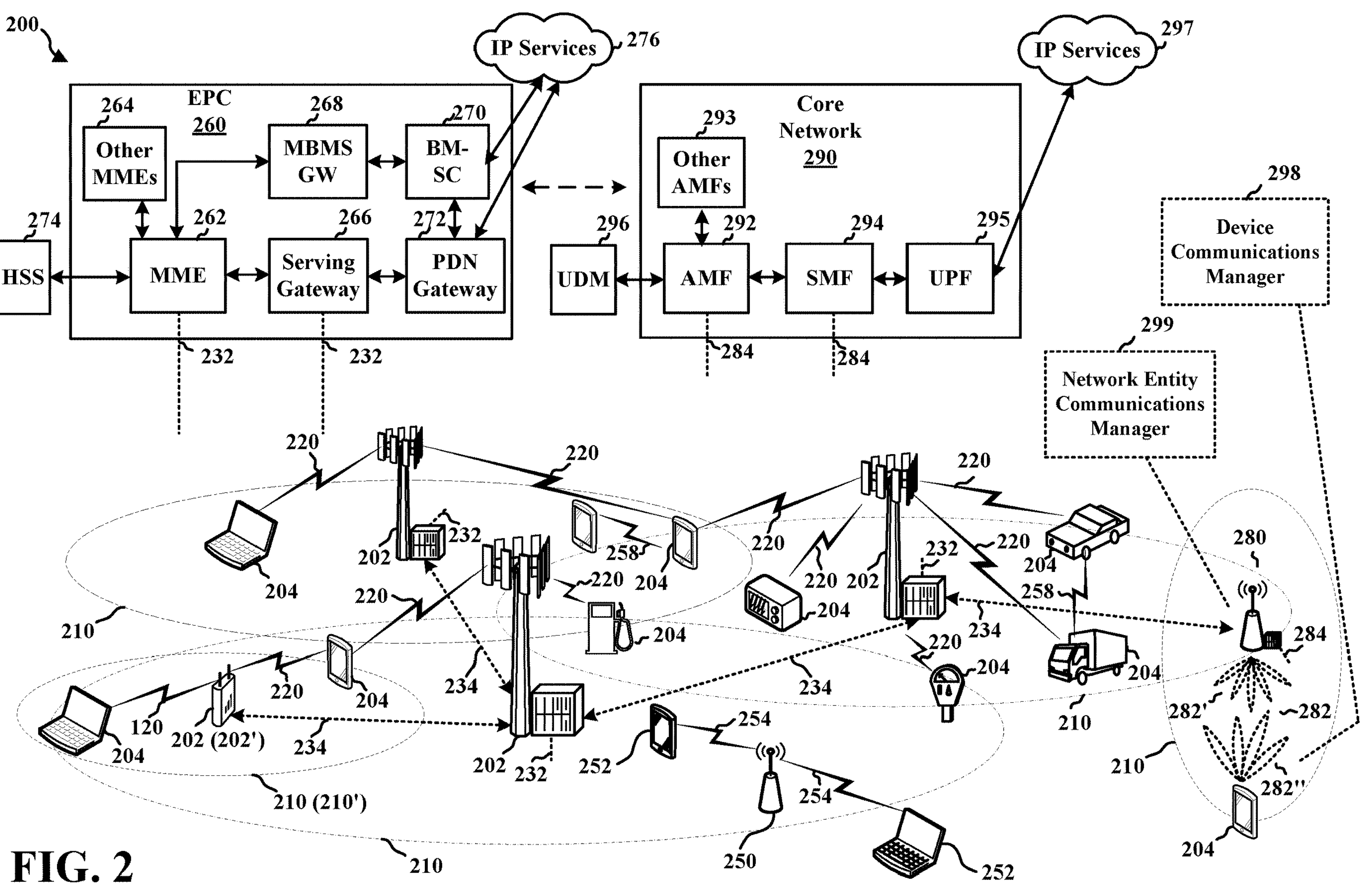
FIG. 2 is a diagram illustrating another example of a wireless communications system and an access network.

FIG. 2 is a diagram 200 illustrating another example of a wireless communications system and an access network. The wireless communications system (also referred to as a wireless wide area network (WWAN)) includes network entities 202, UEs 204, an Evolved Packet Core (EPC) 260, and another core network 290 (e.g., a 5G Core (5GC)). The network entities 202 may include macrocells (high power cellular base station) and/or small cells (low power cellular base station). The macrocells include base stations. The small cells include femtocells, picocells, and microcells.

The network entities 202 configured for 4G LTE (collectively referred to as Evolved Universal Mobile Telecommunications System (UMTS) Terrestrial Radio Access Network (E-UTRAN)) may interface with the EPC 260 through backhaul links 232 (e.g., S1 interface). The network entities 202 configured for 5G NR (collectively referred to as Next Generation RAN (NG-RAN)) may interface with core network 290 through backhaul links 284. In addition to other functions, the network entities 202 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 202 may communicate directly or indirectly (e.g., through the EPC 260 or core network 290) with each other over backhaul links 234 (e.g., X2 interface). The backhaul links 234 may be wired or wireless.

In some examples, the wireless communications system and access network may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU), as described above with respect to FIG. 1. The RU is where radio frequency (RF) signals are transmitted, received, amplified, and/or digitized. The RU may be located at, near, or integrated with an antenna. The DU and the CU provide computational functions and may facilitate the transmission of digitized radio signals within the network. The DU may be physically located at or near the RU. The CU may be located near the core network.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

The network entities 202 may wirelessly communicate with the UEs 204. Each of the network entities 202 may provide communication coverage for a respective geographic coverage area 210. There may be overlapping geographic coverage areas 210. For example, the small cell 202' may have a coverage area 210' that overlaps the coverage area 210 of one or more macro network entities 202. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 220 between the network entities 202 and the UEs 204 may include uplink (UL) (also referred to as reverse link) transmissions from a UE 204 to a network entity 202 and/or downlink (DL) (also referred to as forward link) transmissions from a network entity 202 to a UE 204. The communication links 220 may use multiple-input and multiple-output (MIMO) antenna technology, including spatial multiplexing, beamforming, and/or transmit diversity. The communication links may be through one or more carriers. The network entities 202/UEs 204 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 204 may communicate with each other using device-to-device (D2D) communication link 258. The D2D communication link 258 may use the DL/UL WWAN spectrum. The D2D communication link 258 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a access point (AP) 250 in communication with Wi-Fi stations (STAs) 252 via communication links 254 in a 5 GHz unlicensed frequency spectrum. When communicating in an unlicensed frequency spectrum, the STAs 252/AP 250 may perform a clear channel assessment (CCA) prior to communicating in order to determine whether the channel is available.

The small cell 202' may operate in a licensed and/or an unlicensed frequency spectrum. When operating in an unlicensed frequency spectrum, the small cell 202' may employ NR and use the same 5 GHz unlicensed frequency spectrum as used by the Wi-Fi AP 250. The small cell 202', employing NR in an unlicensed frequency spectrum, may boost coverage to and/or increase capacity of the access network.

A network entity 202, whether a small cell 202' or a large cell (e.g., macro base station), may include a base station, eNB, gNodeB (gNB), or another type of base station. Some network entities, such as gNB 280 may operate in a traditional sub 6 GHz spectrum, in millimeter wave (mmW) frequencies, and/or near mmW frequencies in communication with the UE 104. When the gNB 280 operates in mmW or near mmW frequencies, the gNB 280 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 280 may utilize beamforming 282 with the UE 204 to compensate for the extremely high path loss and short range.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The network entity 280 may transmit a beamforrned signal to the UE 204 in one or mare transmit directions 282'. The UE 204 may receive the beamformed signal from the network entity 280 in one or more receive directions 282". The UE 204 may also transmit a beamformed signal to the network entity 280 in one or more transmit directions. The network entity 280 may receive the beamformed signal from the UE 204 in one or more receive directions. The network entity 280/UE 204 may perform beam training to determine the best receive and transmit directions for each of the network entity 280/UE 204. The transmit and receive directions for the network entity 280 may or may not be the same. The transmit and receive directions for the UE 204 may or may not be the same.

The EPC 260 may include a Mobility Management Entity (MME) 262, other MMEs 264, a Serving Gateway 266, a Multimedia Broadcast Multicast Service (MBMS) Gateway 268, a Broadcast Multicast Service Center (BM-SC) 270, and a Packet Data Network (PDN) Gateway 272. The MME 262 may be in communication with a Home Subscriber Server (HSS) 274. The MME 262 is the control node that processes the signaling between the UEs 204 and the EPC 260. Generally, the MME 262 provides bearer and connection management. All user Internet protocol (IP) packets are transferred through the Serving Gateway 266, which itself is connected to the PDN Gateway 272. The PDN Gateway 272 provides UE IP address allocation as well as other functions. The PDN Gateway 272 and the BM-SC 270 are connected to the IP Services 276. The IP Services 276 may include the Internet, an intranet, an IP Multimedia Subsystem (IMS), a PS Streaming Service, and/or other IP services. The BM-SC 270 may provide functions for MBMS user service provisioning and delivery. The BM-SC 270 may serve as an entry point for content provider MBMS transmission, may be used to authorize and initiate MBMS Bearer Services within a public land mobile network (PLMN), and may be used to schedule MBMS transmissions. The MBMS Gateway 268 may be used to distribute MBMS traffic to the network entities 202 belonging to a Multicast Broadcast Single Frequency Network (MBSFN) area broadcasting a particular service, and may be responsible for session management (start/stop) and for collecting eMBMS related charging information.

The core network 290 may include an Access and Mobility Management Function (AMF) 292, other AMFs 293, a Session Management Function (SMF) 294, and a User Plane Function (UPF) 295. The AMF 292 may be in communication with a Unified Data Management (UDM) 296. The AMF 292 is the control node that processes the signaling between the UEs 204 and the core network 290. Generally, the AMF 292 provides QoS flow and session management. All user Internet protocol (IP) packets are transferred through the UPF 295. The UHF 295 provides UE IP address allocation as well as other functions. The UPF 295 is connected to the IP Services 297. The IP Services 297 may include the Internet, an intranet, an IP Multimedia Subsystem (IMS), a PS Streaming Service, and/or other IP services.

The network entity may also be referred to as a base station, gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The network entity 202 provides an access point to the EPC 260 or core network 290 for a UE 204. Examples of UEs 204 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 204 may be referred to as IoT devices (e.g., parking meter, gas pump, toaster, vehicles, heart monitor, etc.). The UE 204 may also be referred to as a station, a mobile station, a subscriber station, a mobile unit, a subscriber unit, a wireless unit, a remote unit, a device, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 2, in certain aspects, the UE 204 may include a device communications manager 298 that may be configured to measure, via one or more device receive beams, one or more signal strengths of one or more network entity transmit beams of a plurality of network entity transmit beams, activate one or more transmission configuration indicator (TCI) states or one or more spatial relation configurations corresponding to the one or more network entity transmit beams based on the measured one or more signal strengths, and output a report indicating the one or more activated TCI states or the one or more activated spatial relation configurations. The device communications manager 298 may further be configured to obtain, from a network entity, information indicating a network entity transmit beam of the one or more network entity transmit beams corresponding to an activated TCI state or an activated spatial relation configuration, and switch, based on the information, to at least one device receive beam of the one or more device receive beams that is associated with the indicated network entity transmit beam to communicate signals with the network entity.

In certain aspects, the network entity 202 may include a network entity communications manager 299 that may be configured to output a plurality of network entity transmit beams, obtain a report indicating one or more transmission configuration indicator (TCI) states or one or more spatial relation configurations corresponding to one or more network entity transmit beams of the plurality of network entity transmit beams, and activate the one or more TCI states or the one or more spatial relation configurations corresponding to the one or more network entity transmit beams. The network entity communications manager 299 may further be configured to provide, to a device, information indicating a network entity transmit beam of the one or more network entity transmit beams corresponding to an activated TCI state or an activated spatial relation configuration, and switch to the indicated network entity transmit beam to communicate signals with the device.

Figures 3A, 3B, 3C, 3D:
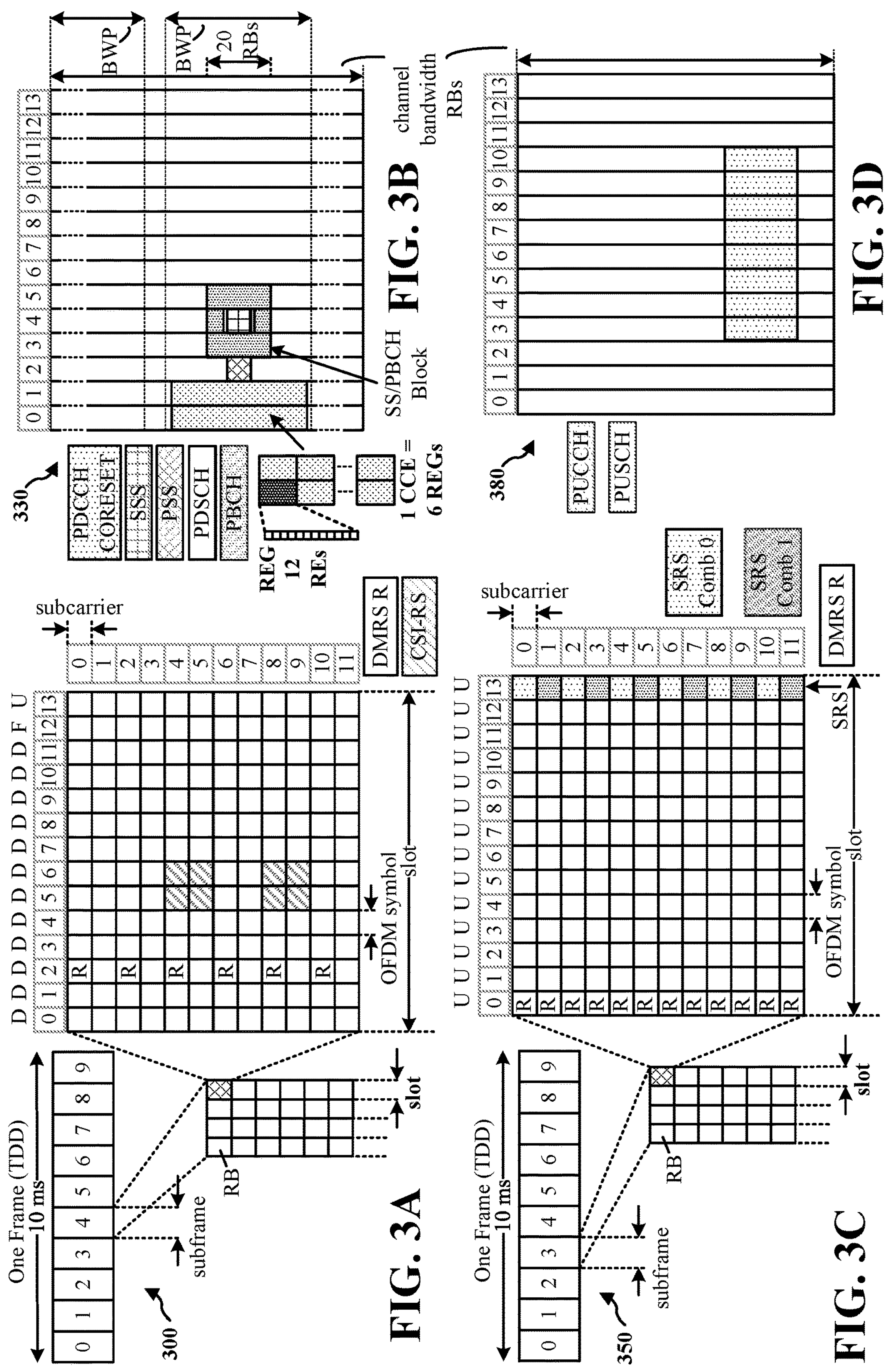
FIGS. 3A, 3B, 3C, and 3D are diagrams illustrating examples of a first 5G/NR frame, DL channels within a 5G/NR subframe, a second 5G/NR frame, and UL channels within a 5G/NR subframe, respectively.

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. Aspects of the disclosure related to a device (e.g., UE) initiating an update of active transmission configuration indicator (TCI) states and/or spatial relation configurations may implement signaling using the 5G/NR frame structure described with respect to FIGS. 3A, 3B, 3C, and 3D. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of normal CP with 14 symbols per slot and numerology $\mu=2$ with 4 slots per subframe. The slot duration is 0.25 ms, the subcarrier spacing is 60 kHz, and the symbol, duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
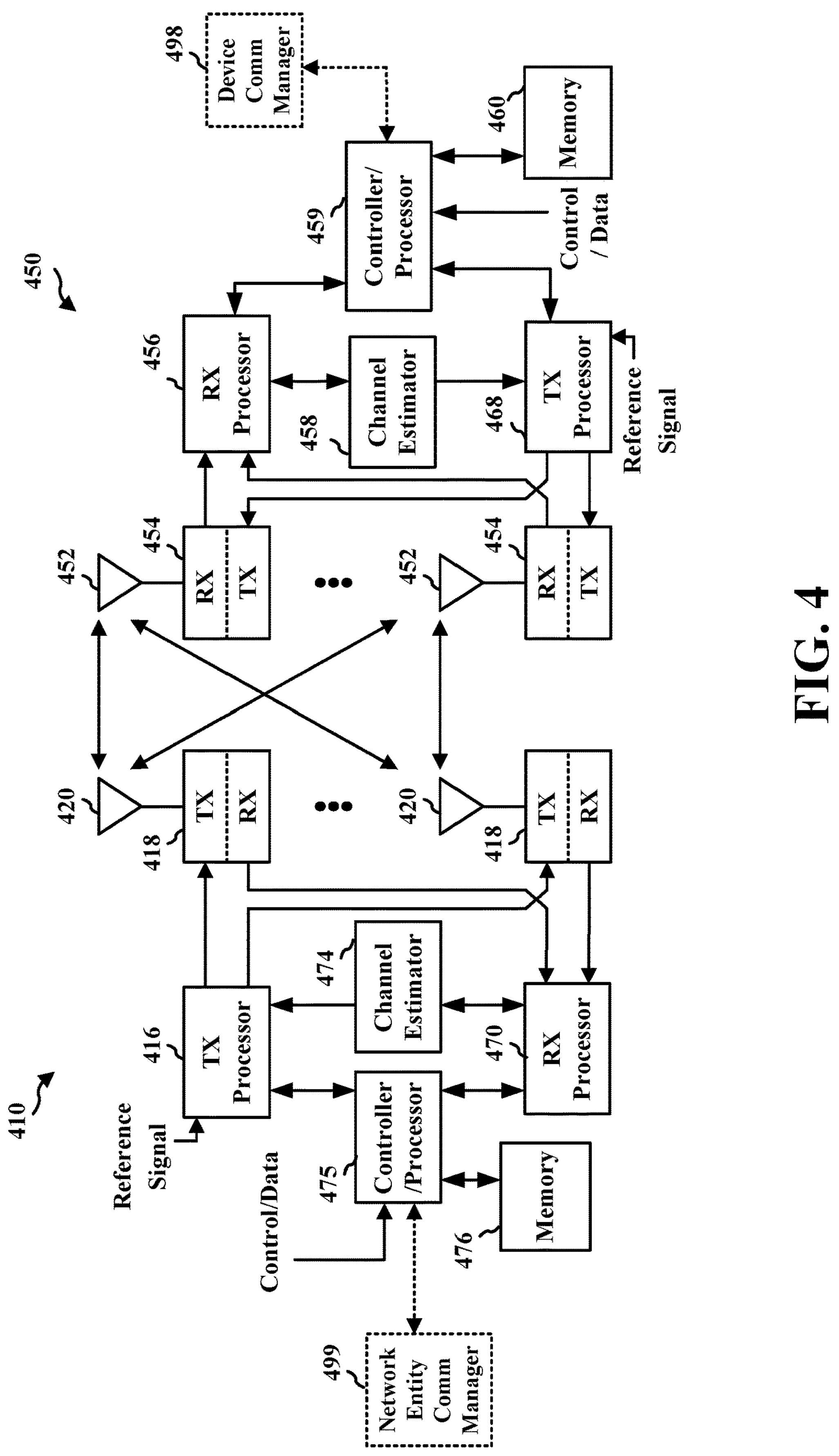
FIG. 4 is a diagram illustrating an example of a network entity and user equipment (UE) in an access network.

FIG. 4 is a block diagram of a network entity 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping on to physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission. Antennas 420 may correspond to antenna elements and/or antenna arrays described below with respect to FIG. 15. Moreover, each transmitter 418TX may include a phase-shifter (e.g., phase-shifter 1516 of FIG. 15) for enabling digital and/or analog beamforming operations via a respective antenna 420 according to aspects of the present disclosure.

At the UE 450, each receiver 454RX receives a signal through its respective antenna 452. Antennas 452 may correspond to antenna elements and/or antenna arrays described below with respect to FIG. 13. Each receiver 454RX may include a phase-shifter (e.g., phase-shifter 1316 of FIG. 13) for enabling digital and/or analog beamforming operations via a respective antenna 452 according to aspects of the present disclosure. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network entity 410. These soft decisions may be based on channel estimates computed by the channel estimator 458. The soft decisions are then decoded and deinterleaved to recover the data and control signals that were originally transmitted by the network entity 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the network entity 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the network entity 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the network entity 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 260. The controller/processor 475 is also responsible for error detection using an ACK and/or NACK protocol to support HARQ operations.

At least one of the TX processor 468, the RX processor 456, and the controller/processor 459 may be configured to perform aspects in connection with the device communications manager 198 of FIG. 1 and/or the device communications manager 298 of FIG. 2. For example, the UE 450 may include a device communications manager 498 configured to perform the operations described above with respect to the device communications manager 198 of FIG. 1 and/or the device communications manager 298 of FIG. 2.

At least one of the TX processor 416, the RX processor 470, and the controller/processor 475 may be configured to perform aspects in connection with the network entity communications manager 199 of FIG. 1 and/or the network entity communications manager 299 of FIG. 2. For example, the network entity 410 may include a network entity communications manager 499 configured to perform the operations described above with respect to the network entity communications manager 199 of FIG. 1 and/or the network entity communications manager 299 of FIG. 2.

Beamforming technology (e.g., 5G NR mmW technology) may use beam management procedures, such as beam measurements and beam switches, to maintain a quality of a link between a network entity (e.g., gNB) and a UE at a sufficient level. Beam management procedures aim to support mobility and the selection of the best beam pairing (or beam pair link (BPL)) between the network entity and the UE. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Figure 5:
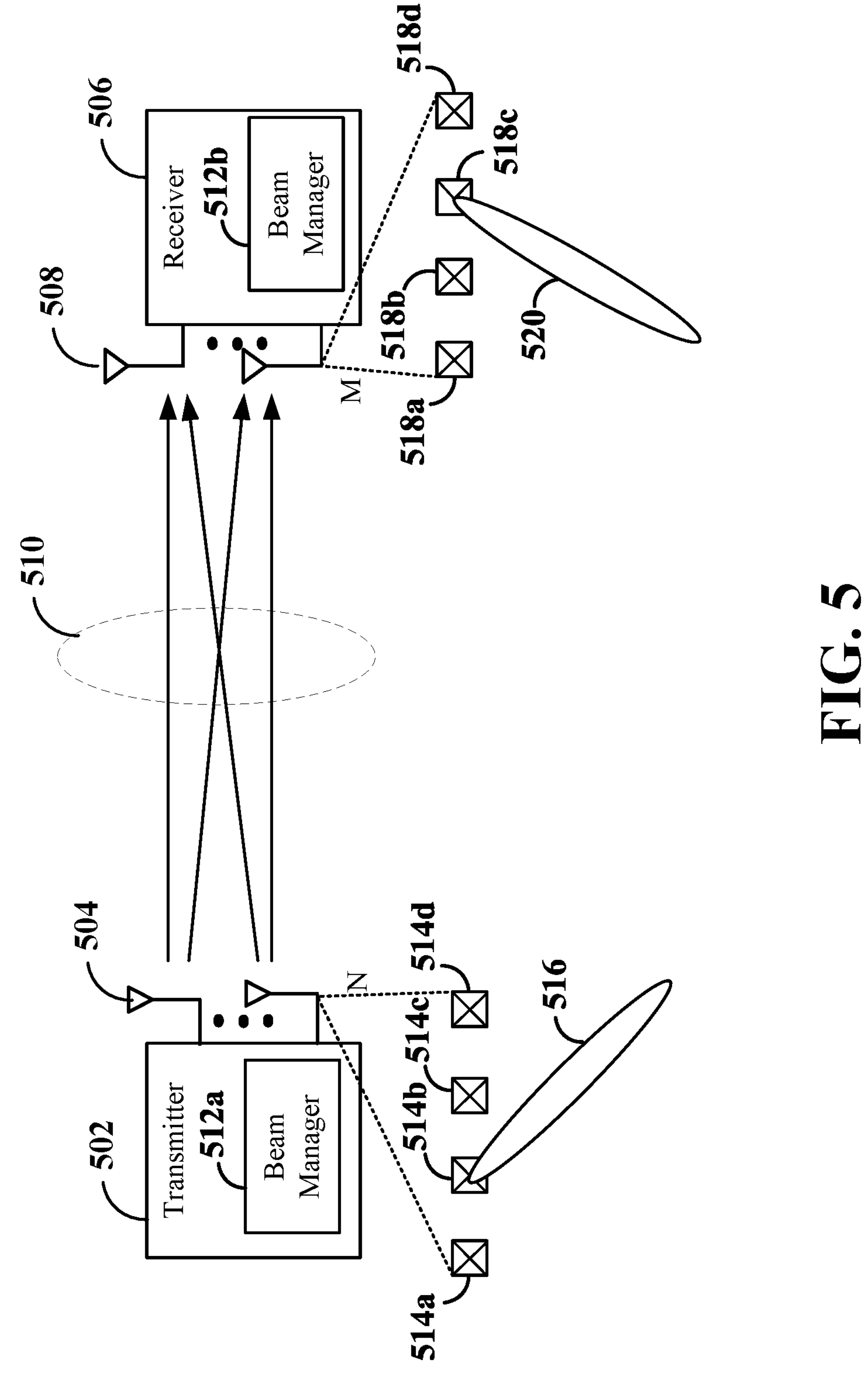
FIG. 5 illustrates an example of a wireless communication system supporting beamforming and/or MIMO.

FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a network entity (e.g., base station, gNB, CU, DU, or RU), a device (e.g., UE), or any other suitable device. In some examples, the transmitter and receiver are each wireless communication devices (e.g., UEs) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially preceding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the network entity to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the network entity, may also affect the transmission rank. For example, the rank (and therefore, the number of data streams) assigned to a particular UE on the downlink may be determined based on the rank indicator (RI) transmitted from the UE to the network entity. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The network entity may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for FR2 or higher (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all UEs in the coverage area of a transmission and reception point (TRP) (e.g., a network entity) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems utilizing FR2 or other higher mmWave frequency band.

The transmit and receive antennas 504 and 508 may each correspond to respective transmit and receive antenna ports (e.g., antenna 504 may correspond to one of antenna port 514*a*, 514*b*, 514*c*, or 514*c* and antenna 508 may correspond to one of antenna ports 518*a*, 518*b*, 518*c*, or 518*d*). Here, the term antenna port at the transmitter 502 refers to a logical port over which a signal (e.g., a data stream or layer) may be transmitted via, for example, a transmit beam 516. In addition, the term antenna port at the receiver 506 refers to a logical port over which the signal may be received via, for example, a receive beam 520. In an example, each of the transmitter 502 and receiver 506 may include one or more antenna arrays (or antenna panels), each including a plurality of antenna elements. The antenna elements of an antenna panel may be mapped to antenna ports on the antenna panel by antenna element combiners.

In various aspects of the disclosure, the receiver 506 may include a beam manager 512*b* configured to measure, via one or more receive beams, one or more signal strengths of one or more transmit beams of a plurality of transmit beams, activate one or more transmission configuration indicator (TCI) states or one or more spatial relation configurations corresponding to the one or more transmit beams based on the measured one or more signal strengths, and output a report indicating the one or more activated TCI states or the one or more activated spatial relation configurations. The beam manager 512*b* may further be configured to obtain, from the transmitter 502, information indicating a transmit beam of the one or more transmit beams corresponding to an activated TCI state or an activated spatial relation configuration, and switch, based on the information, to at least one receive beam of the one or more receive beams that is associated with the indicated transmit beam to communicate signals with the transmitter 502.

In addition, the transmitter 502 may include a beam manager 512*a* configured to output a plurality of transmit beams, obtain a report indicating one or more transmission configuration indicator (TCI) states or one or more spatial relation configurations corresponding to one or more transmit beams of the plurality of transmit beams, and activate the one or more TCI states or the one or more spatial relation configurations corresponding to the one or more transmit beams. The beam manager 512*a* may further be configured to provide, to the receiver 506, information indicating a transmit beam of the one or more transmit beams corresponding to an activated TCI state or an activated spatial relation configuration, and switch to the indicated network entity transmit beam to communicate signals with the receiver 506.

Figure 6A:
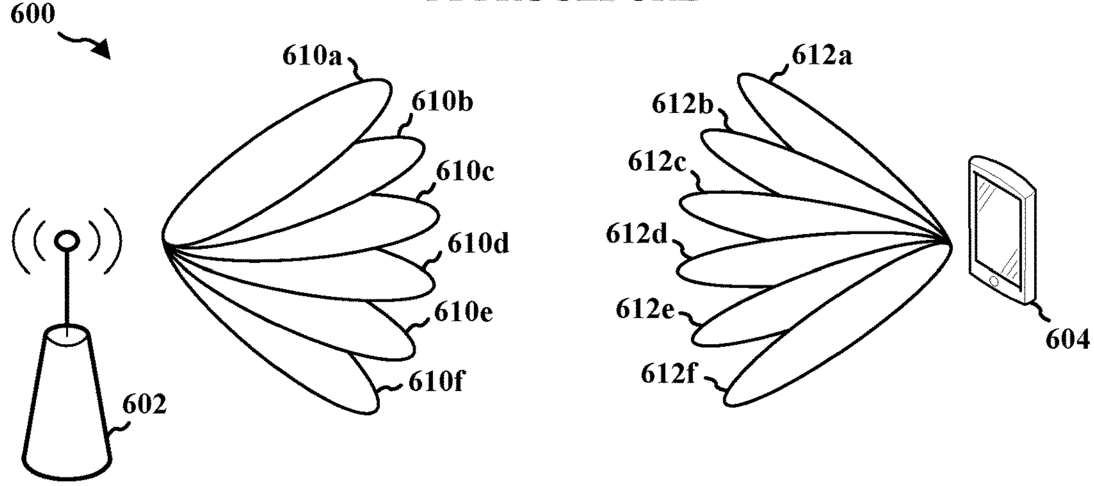
FIGS. 6A, 6B, and 6C are diagrams illustrating examples of beam management procedures, including beam refinement procedures, between a network entity and a UE according to some aspects.
Figure 6B:
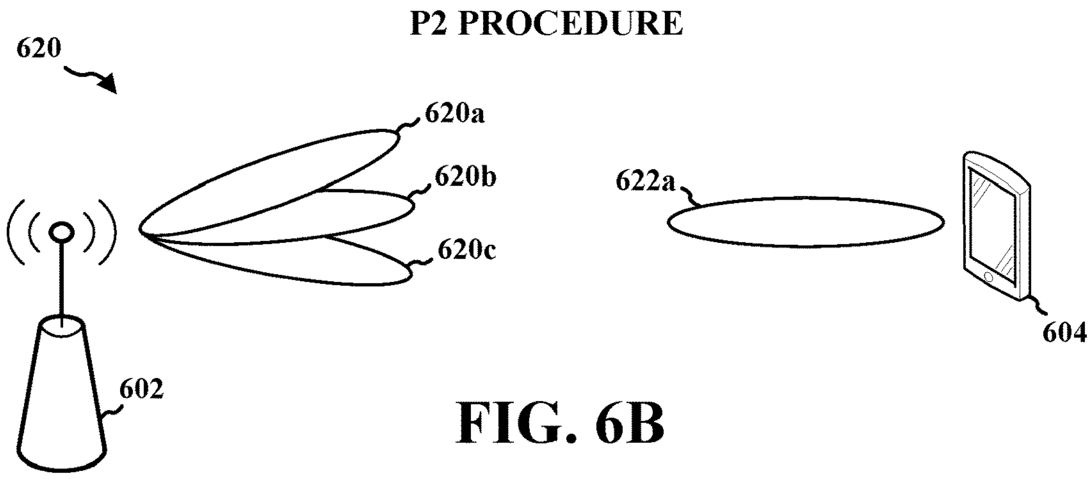
Figure 6C:
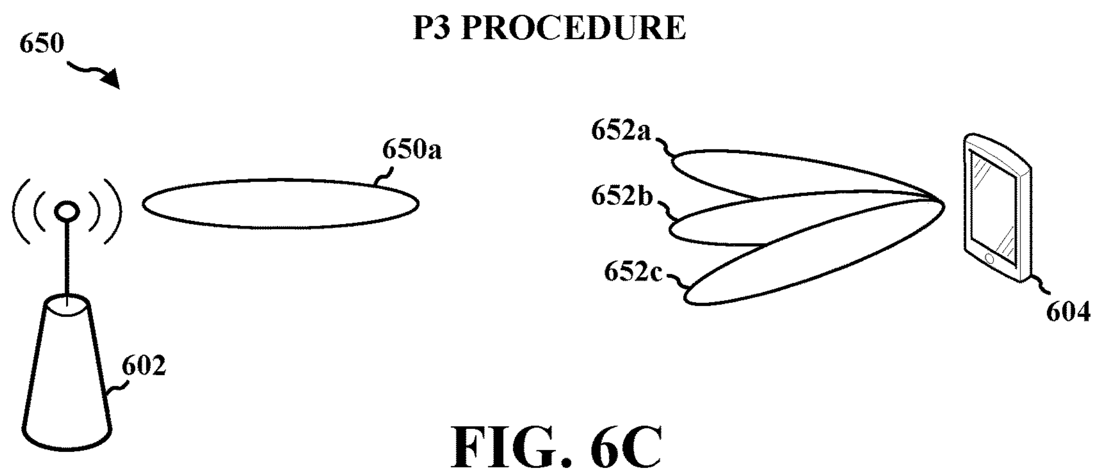

FIGS. 6A, 6B, and 6C are diagrams illustrating examples of beam management procedures, including beam refinement procedures, between a network entity 602 and a UE 604 according to some aspects. The network entity 602 may be any of the network entities described above with respect to FIGS. 1, 2, 4, and/or 5, and the UE 604 may be any of the UEs described above with respect to FIGS. 1, 2, 4, and/or 5. In some examples, the network entity 602 may be implemented as an aggregated base station or a disaggregated base station. In a disaggregated base station architecture, the network entity 602 may include one or more of a central unit (CU), a distributed unit (DU), or a radio unit (RU).

The network entity 602 may generally have the capability to communicate with the UE 604 using one or more transmit beams, and the UE 604 may further have the capability to communicate with the network entity 602 using one or more receive beams. As used herein, the term transmit beam refers to a beam on the network entity 602 that may be utilized for downlink or uplink communication with the UE 604. In addition, the term receive beam refers to a beam on the UE 604 that may be utilized for downlink or uplink communication with the network entity 602.

In the example shown in FIG. 6A, the network entity 602 is configured to generate a plurality of transmit beams 610*a*-610*f*, each associated with a different spatial direction. Each of the transmit beams 610*a*-610*f* may be referenced by a respective beam ID (e.g., an SSB resource indicator (SRI)). In addition, the UE 604 is configured to generate a plurality of receive beams 612*a*-612*f*, each associated with a different spatial direction. Each of the receive beams 612*a*-612*f* may further be referenced by a respective beam ID (e.g., via a quasi-colocation (QCL) relation to an SSB resource indicator (SRI), a CSI-RS resource indicator (CRI), or a SRS resource indicator (SRI)). In some examples, the transmit beams 610*a*-610*f* on the network entity 602 and the receive beams 612*a*-612*f* on the UE 604 may be spatially directional mmWave beams, such as FR2, FR4-a, FR4-1, FR4, or FR5 beams. It should be noted that while some beams are illustrated as adjacent to one another, such an arrangement may be different in different aspects. For example, transmit beams 610*a*-610*f* transmitted during a same symbol may not be adjacent to one another. In some examples, the network entity 602 and UE 604 may each transmit more or less beams distributed in all directions (e.g., 360 degrees) and in three-dimensions. In addition, the transmit beams 610a-610f may include beams of varying beam width. For example, the network entity 602 may transmit certain signals (e.g., SSBs) wider beams and other signals (e.g., CSI-RSs) on narrower beams.

The network entity 602 and UE 604 may select one or more transmit beams 610a-610f on the network entity 602 and one or more receive beams 612a-612f on the UE 604 for communication of uplink and downlink signals therebetween using a beam management procedure. In one example, as shown in FIG. 6A, during initial cell acquisition, the UE 604 may perform a P1 beam management procedure 600 to scan the plurality of transmit beams 610a-610f transmitted in a wide range beam sweep on the plurality of receive beams 612a-612f to select a beam pair link (e.g., one of the transmit beams 610a-610f and one of the receive beams 612a-612f) for a physical random access channel (PRACH) procedure for initial access to the cell. For example, periodic SSB beam sweeping may be implemented on the network entity 602 at certain intervals (e.g., based on the SSB periodicity). Thus, the network entity 602 may be configured to sweep or transmit an SSB on each of a plurality of wider transmit beams 610a-610f. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam. The selected transmit beam and receive beam form a beam pair link (BPL) for the PRACH procedure. Here, the selected transmit beam may be associated with a particular RACH occasion that may be utilized by the UE 604 to transmit a PRACH preamble. In this way, the network entity 602 is informed of the selected transmit beam.

After completing the PRACH procedure, as shown in FIG. 6B, the network entity 602 and UE 604 may perform a P2 beam management procedure 620 for beam refinement. For example, the network entity 602 may be configured to sweep or transmit a CSI-RS on each of a plurality of narrower transmit beams 620a-620c in a narrow range beam sweep for beam refinement. For example, each of the CSI-RS beams may have a narrower beam width than the SSB beams, and thus the transmit beams 620a-620c transmitted during the P2 procedure may each be a sub-beam of an SSB transmit beam selected during the P1 procedure (e.g., within the spatial direction of the SSB transmit beam). Transmission of the CSI-RS transmit beams may occur periodically (e.g., as configured via radio resource control (RRC) signaling by the network entity), semi-persistently (e.g., as configured via RRC signaling and activated/deactivated via medium access control-control element (MAC-CE) signaling by the network entity), or aperiodically (e.g., as triggered by the network entity via downlink control information (DCI)). The UE 604 is configured to scan the plurality of CSI-RS transmit beams 620a-620c on one or more of the plurality of receive beams. In the example shown in FIG. 6B, the UE 604 scans the CSI-RS transmit beams 620a-620c on a single receive beam 622a selected during the P1 procedure. The UE 604 then performs beam measurements (e.g., RSRP, SINR, etc.) of the transmit beams 620a-620c on the receive beam 622a to determine the respective beam quality of each of the transmit beams 620a-620c.

The UE 604 can then generate and transmit a Layer 1 (L1) measurement report (e.g., L1-RSRP or L1-SINR report), including the respective beam ID (e.g., CSI-RS resource indicator (CRI)) and beam measurement (e.g., RSRP) of one or more of the CSI-RS transmit beams 620a-620c to the network entity 602. The network entity 602 may then select one or more CSI-RS transmit beams on which to communicate with the UE 604. In some examples, the selected CSI-RS transmit beam(s) have the highest RSRP from the L1 measurement report. Transmission of the L1 measurement report may occur periodically (e.g., as configured via RRC signaling by the network entity), semi-persistently (e.g., as configured via RRC signaling and activated/deactivated via MAC-CE signaling by the network entity), or aperiodically (e.g., as triggered by the network entity via DCI).

The UE 604 may further refine the receive beam for each selected serving CSI-RS transmit beam to form a respective refined BPL for each selected serving CSI-RS transmit beam. For example, as shown in FIG. 6C, the UE 604 may perform a P3 beam management procedure 650 to refine the UE-beam of a BPL. In an example, the network entity 602 may repeat transmission of a selected transmit beam 650a selected during the P2 procedure to the UE 604. The UE 604 can scan the transmit beam 650a using different receive beams 652a-652c to obtain new beam measurements for the selected CSI-RS transmit beam 650a and select the best receive beam to refine the BPL for transmit beam 650a. In some examples, the selected receive beam to pair with a particular CSI-RS transmit beam 650a may be the receive beam on which the highest RSRP for the particular CSI-RS transmit beam is measured.

In some examples, in addition to configuring the UE 604 to perform P2 beam refinement (e.g., CSI-RS beam measurements), the network entity 602 may configure the UE 604 to perform a P1 beam management procedure (e.g., SSB beam measurements) outside of a RACH procedure and to provide an L1 measurement report containing beam measurements of one or more SSB transmit beams 610a-610f as measured on one or more of the receive beams 612a-612f. In this example, the L1 measurement report may include multiple RSRPs for each transmit beam, with each RSRP corresponding to a particular receive beam to facilitate selection of BPL(s). For example, the network entity 602 may configure the UE 604 to perform SSB beam measurements and/or CSI-RS beam measurements for various purposes, such as beam failure detection (BRD), beam failure recovery (BFR), cell reselection, beam tracking (e.g., for a mobile UE 604 and/or network entity 602), or other beam optimization purpose.

In one example, a single CSI-RS transmit beam (e.g., beam 620b) on the network entity 602 and a single receive beam (e.g., beam 622a) on the UE 604 may form a single BPL used for communication between the network entity 602 and the UE 604. In another example, multiple CSI-RS transmit beams (e.g., beams 620a, 620b, and 620c) on the network entity 602 and a single receive beam (e.g., beam 622a) on the UE 604 may form respective BPLs used for communication between the network entity 602 and the UE 604. In another example, multiple CSI-RS transmit beams (e.g., beams 620a, 620b, and 620c) on the network entity 602 and multiple receive beams (e.g., beams 652b and 652c) on the UE 604 may form multiple BPLs used for communication between the network entity 602 and the UE 604. In this example, a first BPL may include transmit beam 620b and receive beam 652b, a second BPL may include transmit beam 620a and receive beam 652b, and a third BPL may include transmit beam 620c and receive beam 652c.

Figure 7A:
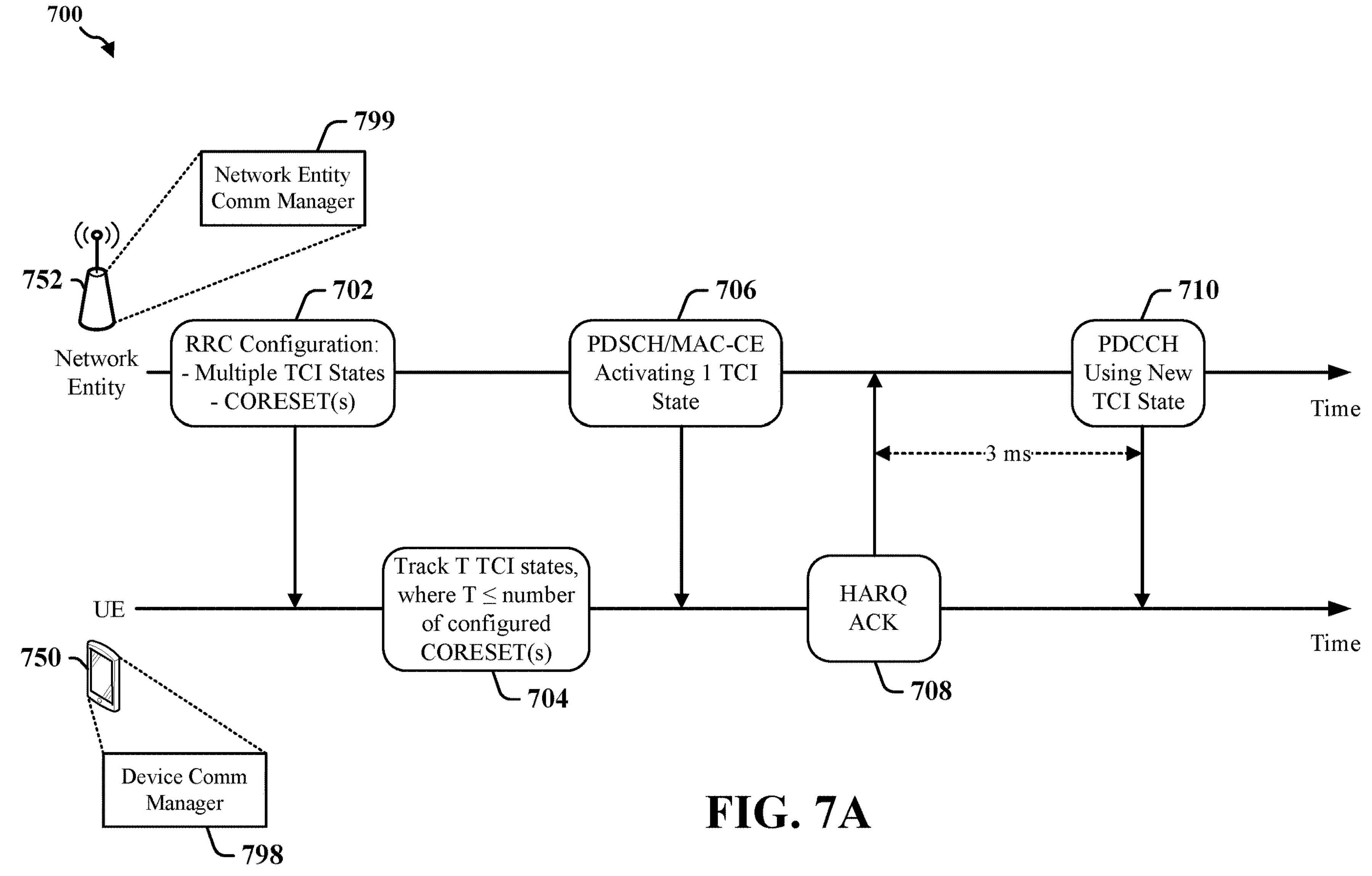
FIG. 7A illustrates a general quasi-coloration (QCL) update procedure for a physical downlink control channel (PDCCH) according to one example.

FIG. 7A illustrates a general quasi-colocation (QCL) update procedure 700 for a physical downlink control channel (PDCCH) according to one example. Two antenna ports are considered to be quasi-colocated if properties of the channel over which a symbol on one antenna port is conveyed can be inferred from the channel over which a symbol on the other antenna port is conveyed. The QCL update procedure 700 may involve a UE 750 and a network entity 752. In an aspect, the UE 750 may include a device communications manager 798 configured to perform the operations described above with respect to the device communications manager 198 of FIG. 1 and/or the device communications manager 298 of FIG. 2. Moreover, the network entity 752 may include a network entity communications manager 799 configured to perform the operations described above with respect to the network entity communications manager 199 of FIG. 1 and/or the network entity communications manager 299 of FIG. 2.

At block 702, the network entity 752 may configure the UE 750 with multiple transmission configuration indicator (TCI) states (e.g., via a higher layer or RRC configuration). Each TCI state may include parameters for configuring a QCL relationship between one or two downlink reference signals and the DM-RS ports of a physical downlink shared channel (PDSCH), the DM-RS ports of the PDCCH, or the CSI-RS port(s) of a CSI-RS resource. The network entity may further configure the UE with a number of control resource sets (CORESETs) via the higher layer or RRC configuration. A CORESET is a set of physical resources within a specific area of a downlink resource grid used to carry PDCCH.

At block 702, the UE may track as many TCI states as the number of CORESETs configured for the UE. Hence, the UE may track T TCI states, where T≤the number of configured CORESETs. For example, if the UE is configured with up to three CORESETS, then the UE may track up to three TCI states.

At block 706, the network entity may send to the UE a medium access control (MAC)-control element (CE) activation command, which is a special payload transmitted within a PDSCH. The MAC-CE may activate/deactivate one of the TCI states. In some aspects, downlink control information (DCI) may also be used to activate/deactivate a TCI state. An example TCI state indication for a UE-specific PDCCH MAC-CE is described with respect to FIG. 7B below.

Upon receiving the MAC-CE activation command transmitted from the network entity at block 704 (activating one TCI state), the UE, at block 708, may send an acknowledgment (ACK) to the network entity. For example, the UE may send, in a slot k, a HARQ ACK via a physical uplink control channel (PUCCH) to acknowledge the MAC-CE received via the PDSCH.

At block 710, sometime after sending the HARD ACK (e.g., 3 ms later), the network entity and UE may begin communicating via the PDCCH using the new TCI state. For example, the UE may apply the activated TCI state in the first slot following the slot k:

$$\text{slot } k+3N_{slot}^{subframe,\mu},$$

wherein μ is the subcarrier spacing (SCS) for PUCCH, e.g., μ=5 kHz, 30 kHz, 120 kHz, etc.

Figure 7B:
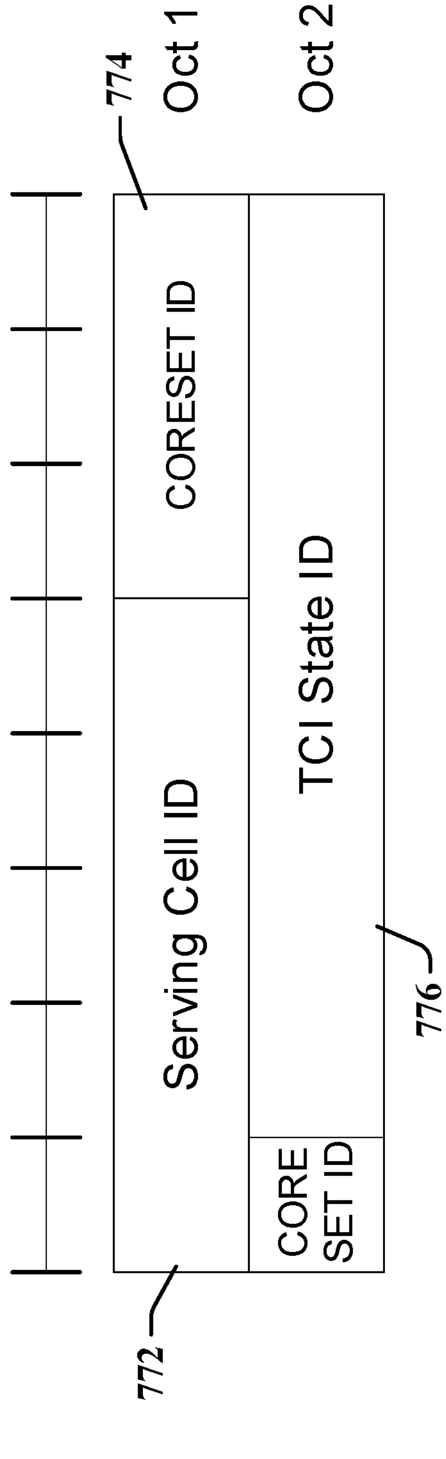
FIG. 7B illustrates a TCI state indication for a UE-specific PDCCH MAC-CE according to one example.

FIG. 7B illustrates a TCI state indication for a UE-specific PDCCH MAC-CE 770 according to one example. The TCI state indication for the UE-specific PDCCH MAC-CE 770 may be identified by a MAC subheader with a logical channel identifier (LCID). The PDCCH MAC-CE 770 may have a size of 16 bits and include a serving cell ID field 772, a CORESET ID field 774, and a TCI state ID field 776. The serving cell ID field 772 may have a length of 5 bits and indicates the identity of the serving cell for which the MAC-CE 770 applies. The CORESET ID field 774 may have a length of 4 bits and indicates a control resource set identified by a control resource set ID for which the TCI state is being indicated. The TCI state ID field 776 may have a length of 7 bits and indicates the TCI state identified by a TCI state ID applicable to the control resource set identified by the CORESET ID field 774.

Figure 8A:
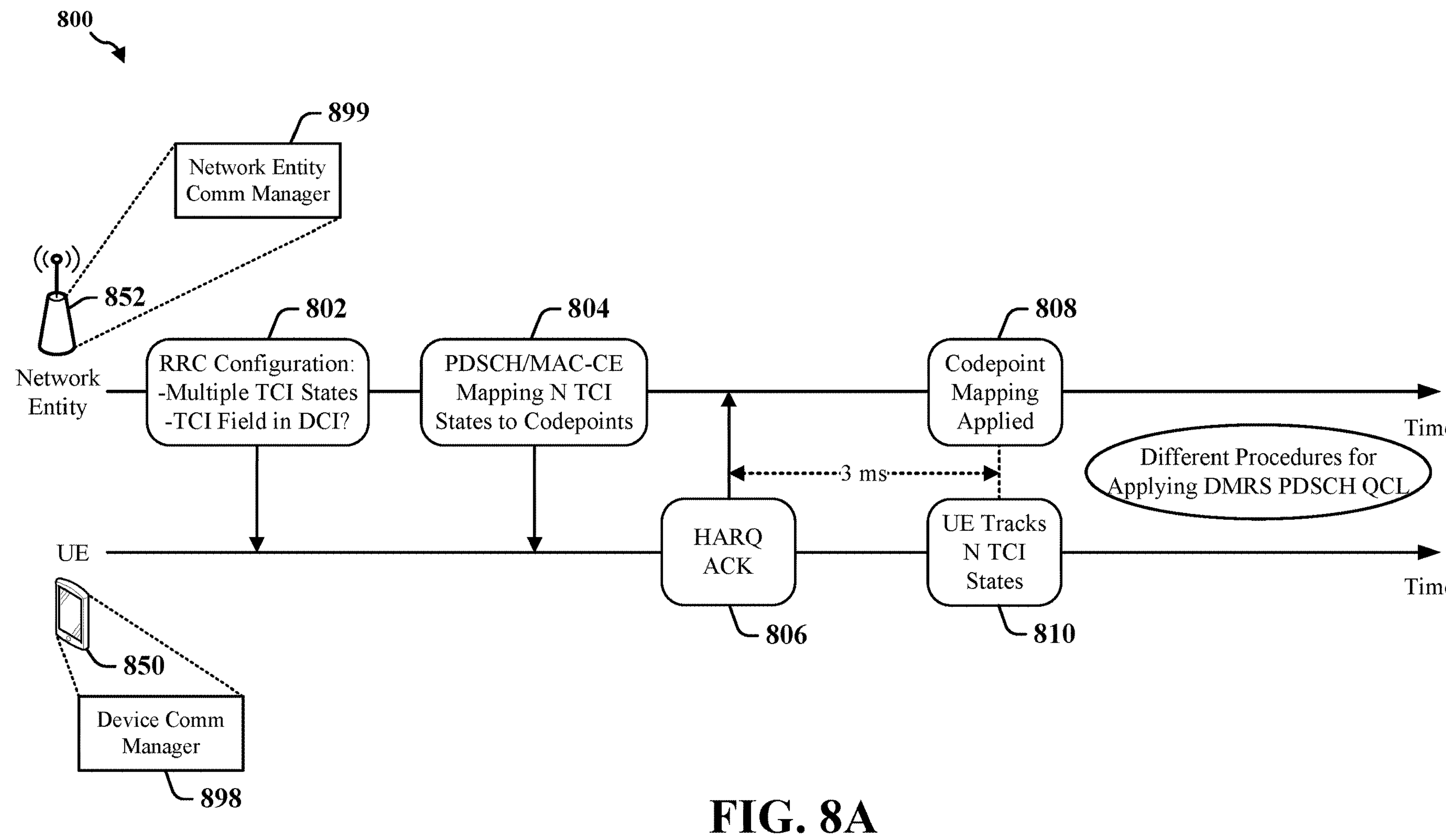
FIG. 8A illustrates a general quasi-colocation (QCL) update procedure for a physical downlink shared channel (PDSCH) according to one example.

FIG. 8A illustrates a general quasi-colocation (QCL) update procedure 800 for a physical downlink shared channel (PDSCH) according to one example. The QCL update procedure 800 may involve a UE 850 and a network entity 852. In an aspect, the UE 850 may include a device communications manager 898 configured to perform the operations described above with respect to the device communications manager 198 of FIG. 1 and/or the device communications manager 298 of FIG. 2. Moreover, the network entity 852 may include a network entity communications manager 899 configured to perform the operations described above with respect to the network entity communications manager 199 of FIG. 1 and/or the network entity communications manager 299 of FIG. 2.

At block 802, the network entity 852 may configure the UE 850 with M TCI states (e.g., via a higher layer or RRC configuration), where M is an integer greater than 0. M may be based on a capability of the UE. The configuration may also indicate the presence or absence of a TCI field for a DCI format. If the TCI field is present/active in the DCI, then a MAC-CE may be sent from the network entity to the UE to activate one or more TCI states. An example TCI state activation/deactivation for a UE-specific PDSCH MAC-CE is described with respect to FIG. 8B below.

At block 804, the network entity may send the MAC-CE (via PDSCH) to the UE. The MAC-CE maps N TCI states (e.g., up to 8 TCI states) of the configured M TCI states to codepoints of the DCI TCI field, where N is an integer greater than 0 and less than M. N may be based on a capability of the UE. Upon receiving the MAC-CE transmitted from the network entity at block 804 (mapping N TCI states to codepoints of the DCI TCI field), the UE, at block 806, may send an acknowledgment (HARQ ACK via PUCCH) to the network entity in a slot n to acknowledge the MAC-CE received via the PDSCH.

At block 808, sometime after the HARQ ACK is communicated (e.g., 3 ms later), the network entity may apply the mapping between the N TCI states and the codepoints of the TCI field. For example, the network entity may apply the mapping in the first slot following the slot n:

$$\text{slot } n+3N_{slot}^{subframe,\mu},$$

wherein μ is the subcarrier spacing (SCS) for PUCCH, e.g., μ=5 kHz, 30 kHz, 120 kHz, etc.

At block 810, the UE begins tracking the N TCI states. Thereafter, different procedures for applying DM-RS QCL for PDSCH may be performed.

Figure 8B:
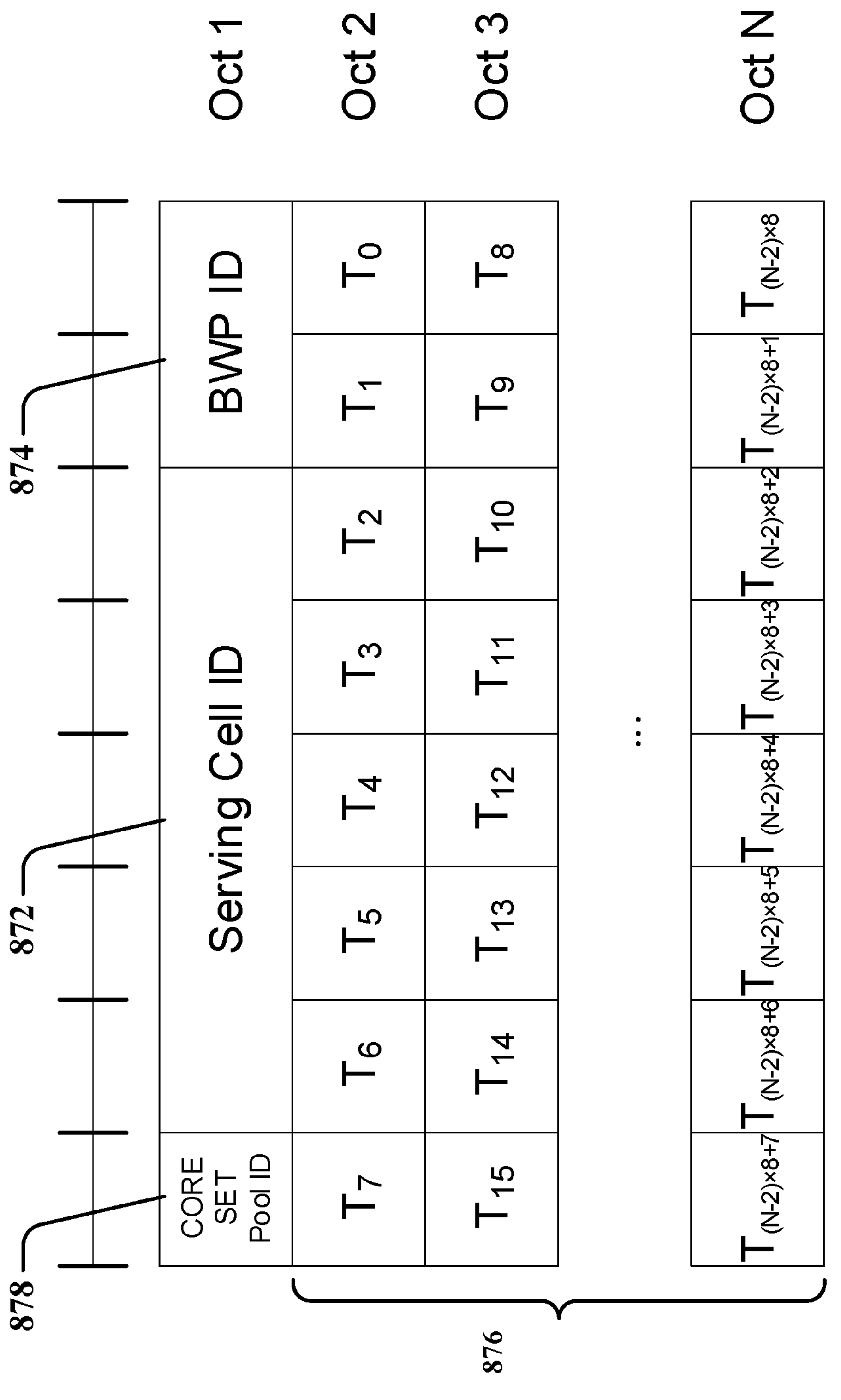
FIG. 8B illustrates TCI states activation/deactivation for a UE-specific PDSCH MAC-CE according to one example.

FIG. 8B illustrates TCI states activation/deactivation for a UE-specific PDSCH MAC-CE 870 according to one example. The TCI states activation/deactivation for the UE-specific PDSCH MAC-CE may be identified by a MAC subheader with a logical channel identifier (LCID). The PDSCH MAC-CE 870 may have a variable size and includes a serving cell ID field 872, a bandwidth part (BWP) ID field 874, a Ti field 876, and a CORESET pool ID field 878. The serving cell ID field 872 may have a length of 5 bits and indicates the identity of the serving cell for which the MAC-CE 870 applies. The BWP ID field 874 may have a length of 2 bits and indicates a downlink BWP for which the MAC-CE 870 applies as the codepoint of a DCI BWP indicator field.

If a TCI state with a TCI state ID i exists, then the Ti field 876 indicates the activation/deactivation status of the TCI state with the TCI state ID i. The Ti field 876 may be set to 1 to indicate that the TCI state with the TCI state ID i is to be activated and mapped to the codepoint of the DCI TCI field. The Ti field 876 may be set to 0 to indicate that the TCI state with the TCI state ID i is to be deactivated and not mapped to the codepoint of the DCI TCI field. The codepoint to which the TCI state is mapped is determined by its ordinal position among all the TCI States with Ti field 876 set to 1. That is, the first TCI state with Ti field 876 set to 1 is to be mapped to the codepoint value 0, the second TCI state with Ti field 876 set to 1 is to be mapped to the codepoint value 1, and so on. The maximum number of activated TCI states may be 8. The activated TCI states may be associated with one physical cell identifier (PCI) different from a serving cell PCI at a time. The CORESET pool ID field 878 indicates that mapping between the activated TCI states and the codepoint of the DCI TCI set by the Ti field 876 is specific to the control resource set ID configured with a CORESET pool ID. The CORESET pool ID field 878 set to 1 indicates that the MAC-CE 870 is to be applied for a downlink transmission scheduled by a CORESET pool ID equal to 1. Otherwise, the MAC-CE 870 is to be applied for a downlink transmission scheduled by a CORESET pool ID equal to 0.

Figure 9A:
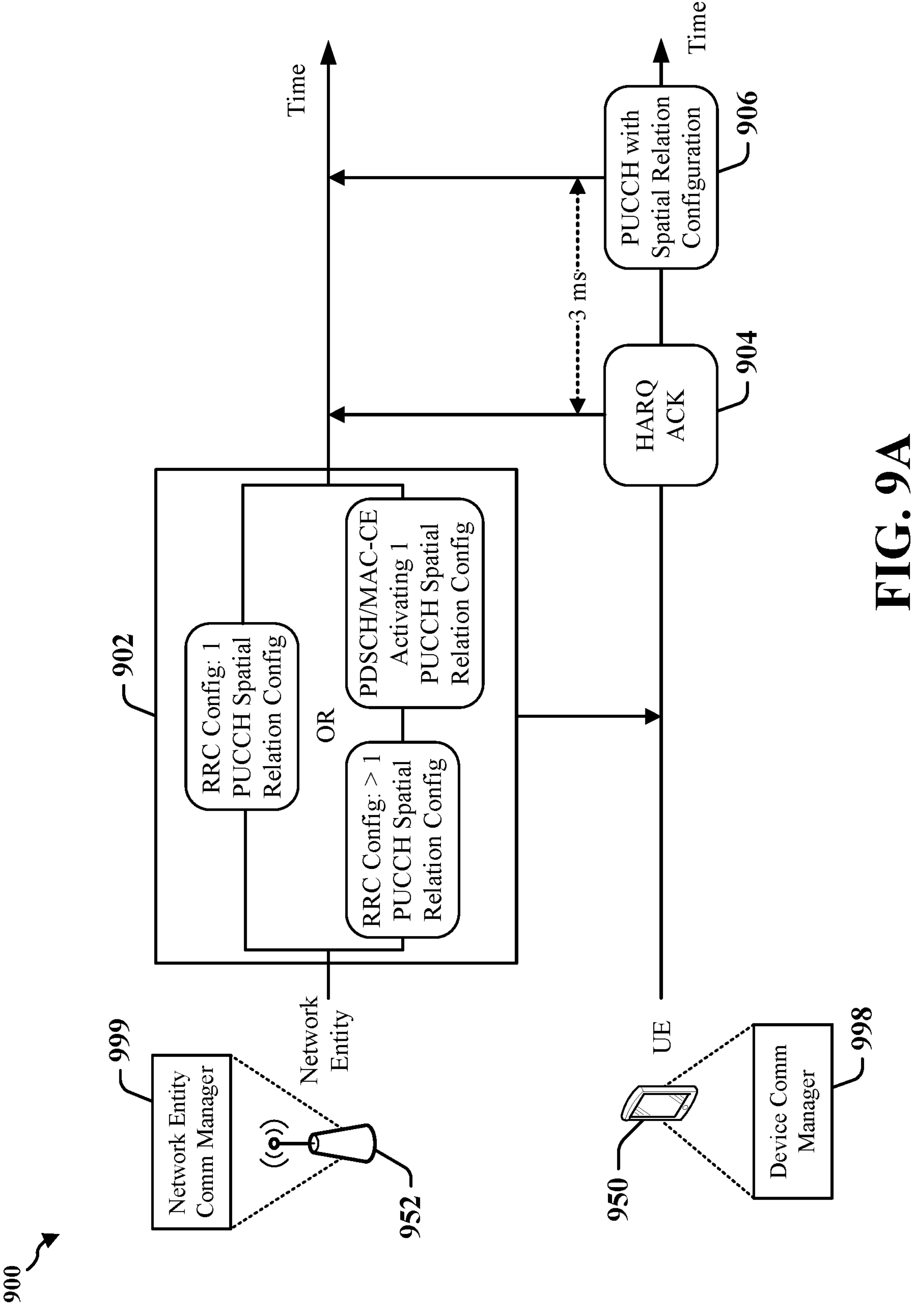
FIG. 9A illustrates a general spatial relation configuration update procedure for a physical uplink control channel (PUCCH) according one example.

FIG. 9A illustrates a general spatial relation configuration update procedure 900 for a physical uplink control channel (PUCCH) according to one example. A spatial relation configuration may include parameters for configuring a beam direction in which the PUCCH is transmitted. A UE spatial domain filter reference may be a synchronization signal block (SSB), channel state information reference signals (CSI-RS), or sounding reference signals (SRS). The spatial relation configuration update procedure 900 may involve a UE 950 and a network entity 952. In an aspect, the UE 950 may include a device communications manager 998 configured to perform the operations described above with respect to the device communications manager 198 of FIG. 1 and/or the device communications manager 298 of FIG. 2. Moreover, the network entity 952 may include a network entity communications manager 999 configured to perform the operations described above with respect to the network entity communications manager 199 of FIG. 1 and/or the network entity communications manager 299 of FIG. 2.

At block 902, a network entity may configure a UE with one or more spatial relation configurations (e.g., via a higher layer or RRC configuration). If more than one spatial relation configuration is configured, then the network entity may send a MAC-CE activation command (via PDSCH) to the UE to activate one of the configured spatial relation configurations. An example PUCCH spatial relation activation/deactivation MAC-CE will be described with respect to FIG. 9B below.

Upon receiving the MAC-CE transmitted from the network entity at block 902 (activating one spatial relation configuration), the UE, at block 904, may send an acknowledgment (HARQ ACK via PUCCH) to the network entity in a slot k to acknowledge the MAC-CE received via the PDSCH. At block 906, sometime after the HARQ ACK is communicated (e.g., 3 ms later), the UE uses the PUCCH with the activated spatial relation configuration. For example, the UE may apply the activated spatial relation configuration for PUCCH in the first slot following the slot k:

$$\text{slot } k+3N_{slot}^{subframe,\mu},$$

wherein μ is the subcarrier spacing (SCS) for PUCCH, e.g., μ=5 kHz, 30 kHz, 120 kHz, etc.

Figure 9B:
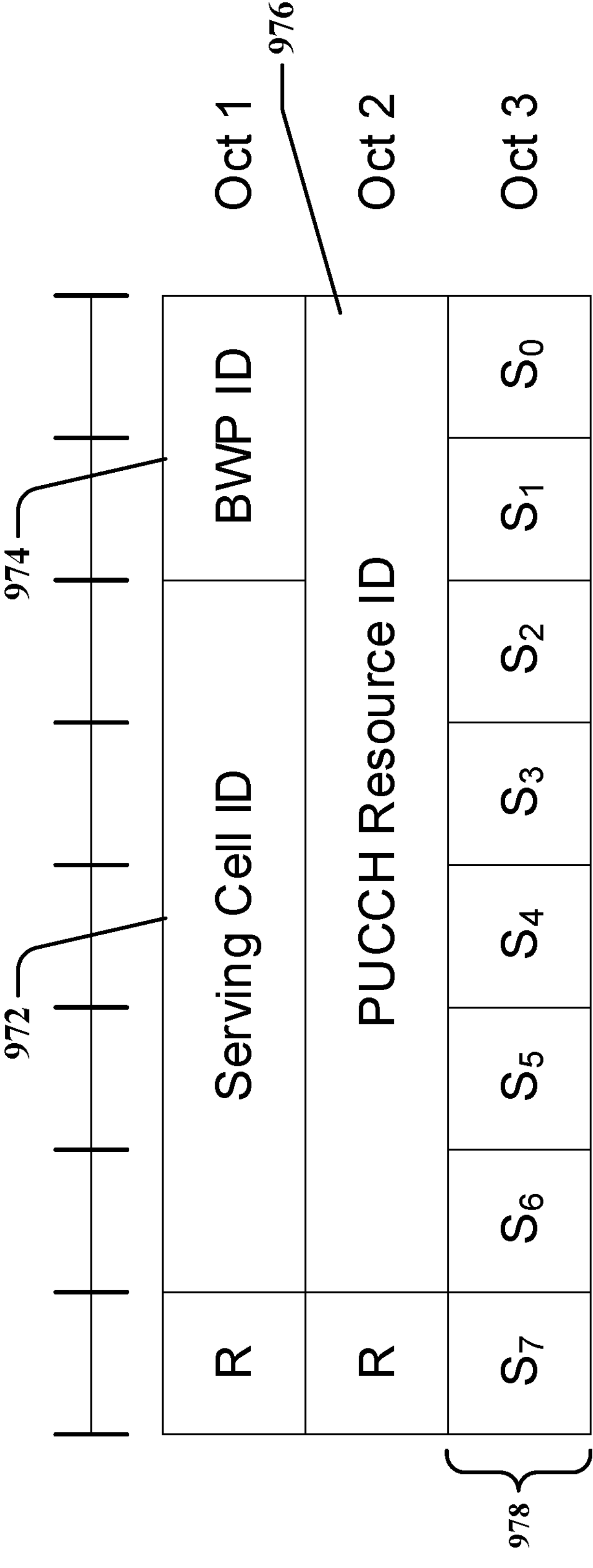
FIG. 9B illustrates a PUCCH spatial relation activation/deactivation MAC-CE according to one example.

FIG. 9B illustrates a PUCCH spatial relation activation/deactivation MAC-CE 970 according to one example. The PUCCH spatial relation activation/deactivation MAC-CE 970 may be identified by a MAC subheader with a logical channel identifier (LCID). The MAC-CE 970 may have a size of 24 bits and include a serving cell ID field 972, a bandwidth part (BWP) ID field 974, PUCCH resource ID field 976, a Si field 978, and two reserved bit (R) fields. The serving cell ID field 972 may have a length of 5 bits and indicates the identity of the serving cell for which the MAC-CE 970 applies. The BWP ID field 974 may have a length of 2 bits and indicates an uplink BWP for which the MAC-CE 970 applies as the codepoint of a DCI BWP indicator field. The PUCCH resource ID field 976 may have a length of 7 bits and includes an identifier of a PUCCH resource.

Regarding the Si field 978, if in a PUCCH configuration in which a PUCCH resource ID is configured, there is a PUCCH spatial relation information with a PUCCH spatial relation information ID configured for the uplink BWP indicated by the BWP ID field 974, then the Si field 978 indicates the activation status of the PUCCH spatial relation information with the PUCCH spatial relation information ID equal to i+1. The Si field 978 may be set to 1 to indicate that the PUCCH spatial relation information with the PUCCH spatial relation information ID equal to i+1 is to be activated. The Si field 978 may be set to 0 to indicate that the PUCCH spatial relation information with the PUCCH spatial relation information ID equal to i+1 is to be deactivated. In an aspect, a single PUCCH spatial relation information can be active for a PUCCH resource at a time.

As described above, a superset of TCI states and/or spatial relation configurations are configured (e.g., via RRC configuration) by a network entity and a subset of the configured TCI states or spatial relation configurations are later activated/selected by sending a MAC-CE activation command to a UE. As such, the network entity controls the selection of the subset of TCI states or spatial relation configurations to activate. The selection may be based on the network entity's estimation (e.g., for uplink communication) and/or previous reports from the UE (e.g., L1 measurement reports).

In an aspect, the selection of the TCI states and/or spatial relation configurations to activate may be improved by allowing the UE to initiate the selection. For example, because the UE is in a position to perform certain measurements (e.g., beam signal strength measurements) better than the network entity (e.g., during downlink communication), the UE can initiate the TCI state/spatial relation configuration selection/activation process and reduce/eliminate the time needed to send an acknowledgement report (e.g., HARQ ACK) back to the network entity and wait for the network entity's reply. Thus, a UE-initiated selection process will reduce latency and overhead. Aspects of the present disclosure relate to UE-initiated/determined activated TCI states and/or spatial relation configurations.

Figure 10:
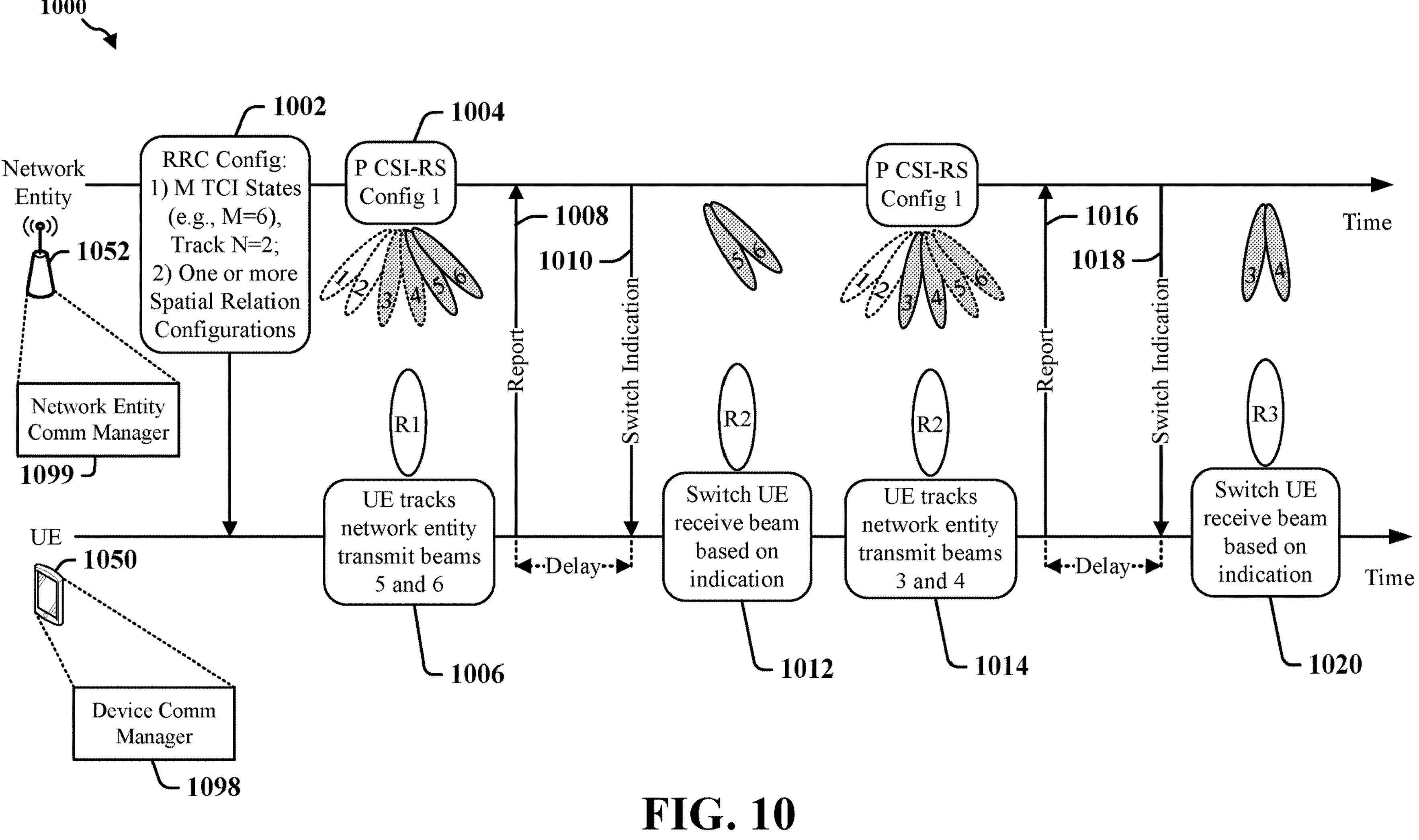
FIG. 10 illustrates a first procedure for a UE autonomously activating a subset of configured TCI states and/or spatial relation configurations in accordance with one or more aspects of the present disclosure.

FIG. 10 illustrates a first procedure 1000 for a UE autonomously activating a subset of configured TCI states and/or spatial relation configurations in accordance with one or more aspects of the present disclosure. The first procedure 1000 may involve a UE 1050 and a network entity 1052. In an aspect, the UE 1050 may include a device communications manager 1098 configured to perform the operations described above with respect to the device communications manager 198 of FIG. 1 and/or the device communications manager 298 of FIG. 2. Moreover, the network entity 1052 may include a network entity communications manager 1099 configured to perform the operations described above with respect to the network entity communications manager 199 of FIG. 1 and/or the network entity communications manager 299 of FIG. 2.

In an aspect, the UE 1050 can autonomously (without having to receive a command from the network entity 1052) select/activate a subset of configured TCI states and/or spatial relation configurations according to the UE's own measurements of reference signals. A maximum number of TCI states and/or spatial relation configurations to be activated may be configured (e.g., via RRC configuration). The UE may start tracking/activating updated TCI states (e.g., parameters for configuring a QCL relationship between downlink reference signal(s) and DM-RS ports of a PDSCH, DM-RS ports of a PDCCH, or CSI-RS port(s) of a CSI-RS resource) and/or spatial relation configurations (e.g., parameters for configuring a beam direction in which a PUCCH is transmitted) corresponding to one or more network entity transmit beams upon measuring reference signals from a network entity (e.g., gNB). The UE may send a report (e.g., L1 measurement report sent via message, information, signaling, etc.) to the network entity indicating the measured and tracked/activated TCI states and/or spatial relation configurations corresponding to the one or more network entity transmit beams. Moreover, the UE may expect the network entity to switch to a network entity transmit beam corresponding to an activated TCI state/spatial relation configuration indicated in the report (message, information, or signaling, etc.) after a certain predefined delay from the sending of the report has elapsed. The delay may be configured by the network entity (e.g., via RRC configuration) and can be based on a capability of the UE (e.g., ability of the UE's hardware, software, and/or power capacity to idle for a period of time).

Referring to FIG. 10, at block 1002, the network entity may configure a UE with a total of M TCI states (e.g., via a higher layer or RRC configuration), where M is an integer greater than 0. Moreover, the network entity may configure the UE to track N TCI states, where N is an integer greater than 0 and less than M. M and N may be based on a capability of the UE. In the example shown in FIG. 10, M=6 (i.e., the UE is configured with a total 6 TCI states) and N=2 (i.e. the UE is to track 2 of the configured 6 TCI states). However, the network entity may configure the UE with any number of TCI states (M) and any number of TCI states to track (N) based on the capability of the UE. For example, if the UE has the hardware, software, and/or power capacity to handle more or less than 6 TCI states, then the network entity may configure M to equal more or less than 6. Moreover, if the UE has the hardware, software, and/or power capacity to track more or less than 2 TCI states, then the network entity may configure N to equal more or less than 2. Additionally, or alternatively, the network entity may configure the UE with one or more spatial relation configurations (e.g., via a higher layer or RRC configuration).

At block 1004, the network entity transmits reference signals based on a reference signal configuration (e.g., via a first periodic CSI-RS configuration (P CSI-RS Config 1)). In the example shown, P CSI-RS Config 1 includes six network entity transmit beams, wherein four network entity transmit beams are transmitted (e.g., network entity transmit beams 3, 4, 5, and 6) and two network entity transmit beams are not transmitted (e.g., network entity transmit beams 1 and 2).

At block 1006, using a UE receive beam R1, the UE tracks two network entity transmit beams (e.g., network entity transmit beams 5 and 6) (e.g., if the UE is configured to track N=2 TCI states). That is, the UE measures the signal strengths of the network entity transmit beams 5 and 6 via the UE receive beam R1. At 1008, the UE sends a report (e.g., message, information, signaling, etc.) to the network entity of the measured signal strengths, which indicate the activated TCI states and/or spatial relation configurations corresponding to the tracked/measured network entity transmit beams 5 and 6. In an aspect, the report may also include an indication of the network entity transmit beams the UE is presently tracking/measuring (e.g., an indication of the network entity transmit beams 5 and 6). Based on the report, the network entity discovers that the UE is interested in the network entity transmit beams 5 and 6, and may therefore, select one of the network entity transmit beams 5 or 6 to communicate with the UE. For example, the network entity may base its selection on a quality of the signal strength measurements. In an aspect, the report may also include an indication that the UE is tracking more beams than what is originally configured. Thus, if the UE is originally configured to track N=2 TCI states (two network entity transmit beams), the UE may dynamically change the number of beams to track and inform the network entity via the report.

At 1010, after a delay from the sending of the report has elapsed, the network entity sends a message to the UE indicating a switch to one of the network entity transmit beams 5 or 6 corresponding to an activated TCI state or an activated spatial relation configuration. For example, the message may include information such as a spatial UE receive beam parameter corresponding to one of the network entity transmit beams 5 or 6. At block 1012, the UE may switch to a UE, receive beam (e.g., UE receive beam R2) based on the spatial UE receive beam parameter indicated by the network entity to communicate signals with the network entity via one of the network entity transmit beams 5 or 6. For example, the UE may switch to the UE receive beam R2 to receive PDCCH/PDSCH from the network entity based on the activated TCI state, or to transmit PUCCH to the network entity based on the activated spatial relation configuration.

In an aspect, after some time, the UE may learn that higher quality signaling is available on other beams (e.g., network entity transmit beams 3 and 4). Accordingly, at block 1014, using a UE receive beam (e.g., UE receive beam R2), the UE may change from communicating signals via the network entity transmit beam 5 or 6 to tracking (measuring the signal strengths of) network entity transmit beams 3 and 4. Thereafter, at 1016, the UE may send a second report to the network entity of the measured signal strengths, which indicate the activated TCI states and/or spatial relation configurations corresponding to the tracked/measured network entity transmit beams 3 and 4. In an aspect, the second report may also include an indication of the beams the UE is presently tracking/measuring (e.g., an indication of the network entity transmit beams 3 and 4). Based on the report, the network entity discovers that the UE is now interested in the network entity transmit beams 3 and 4, and may therefore, select one of the network entity transmit beams 3 or 4 to communicate with the UE. For example, the network entity may base its selection on a quality of the signal strength measurements. In an aspect, the second report may also include an indication that the UE is tracking more beams than what is originally configured. Thus, if the UE is originally configured to track N=2 TCI states (two network entity transmit beams), the UE may dynamically change the number of beams to track and inform the network entity via the second report.

At 1018, after a delay from the sending of the second report has elapsed, the network entity sends a message to the UE indicating a switch to one of the network entity transmit beams 3 or 4 corresponding to an activated TCI state or an activated spatial relation configuration. For example, the message may include information such as a spatial UE receive beam parameter corresponding to one of the network entity transmit beams 3 or 4. At block 1020, the UE may switch to a UE receive beam (e.g., UE receive beam R3) based on the spatial UE receive beam parameter indicated by the network entity to communicate signals with the network entity via one of the network entity transmit beams 3 or 4. For example, the UE may switch to the UE receive beam R3 to receive PDCCH/PDSCH from the network entity based on the activated TCI state, or to transmit PUCCH to the network entity based on the activated spatial relation configuration.

As shown and described with respect to FIG. 10, the UE is able to change from tracking network entity transmit beams 5 and 6 to tracking network entity transmit beams 3 and 4 without the network entity sending a command to do so. Previously, after tracking the network entity transmit beams 5 and 6, the UE had to receive an activation command (e.g., MAC-CE) from the network entity, send a HARQ ACK back to the network entity, and wait a predefined period of time (e.g., 3 ms) before being able to track the network entity transmit beams 3 and 4. However, in the present disclosure, the UE can autonomously change from tracking the network entity transmit beams 5 and 6 to tracking the network entity transmit beams 3 and 4 without network entity intervention and less back-and-forth signaling. Hence, the present disclosure facilitates the performance of tracking decisions at a UE side rather than a network entity side, and therefore, promotes system efficiency by reducing latency and overhead (e.g., by eliminating certain message exchanges (activation command, HARQ ACK, etc.) and predefined wait time) based on the UE's ability to measure the quality of downlink beams.

Figure 11:
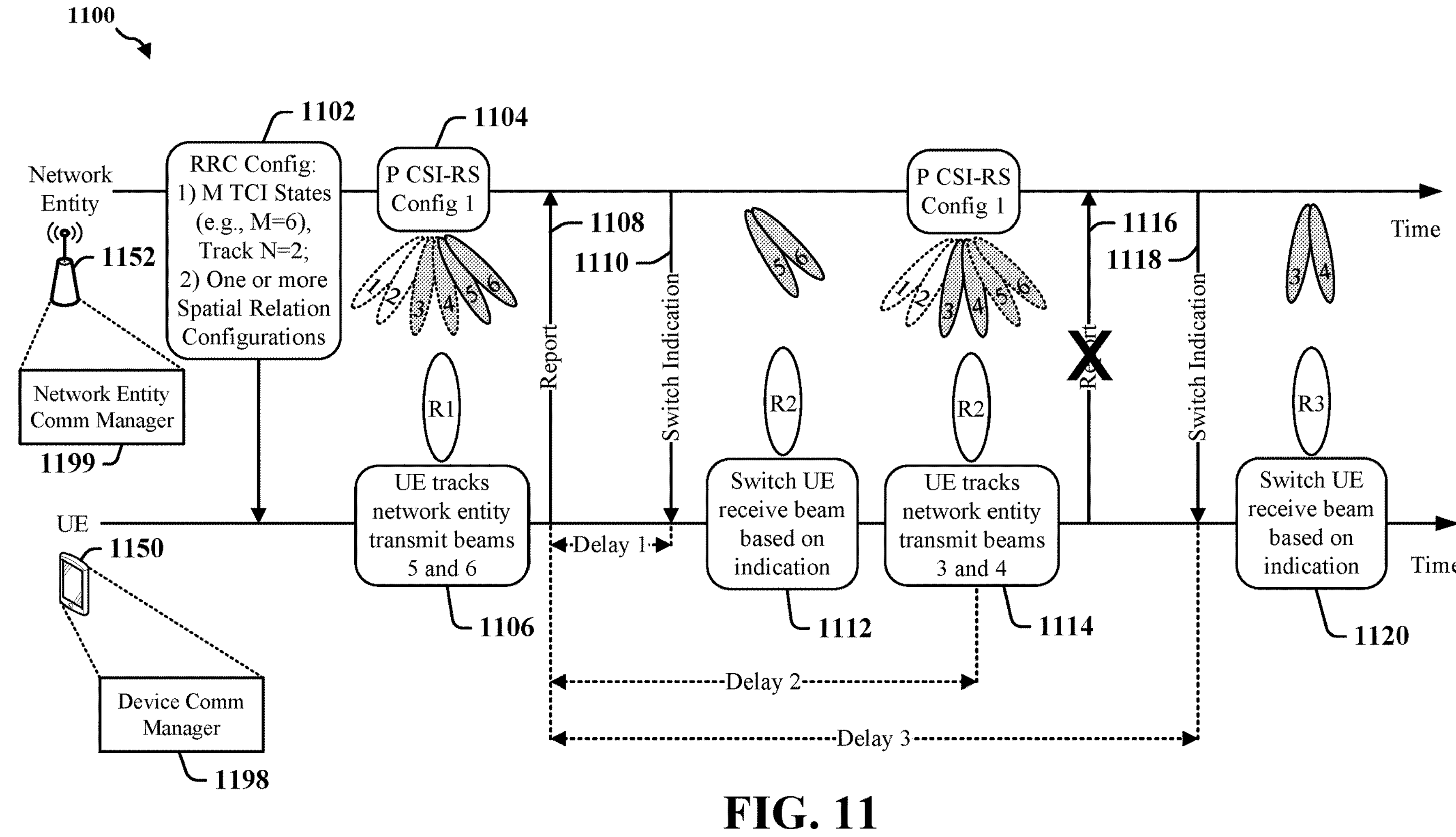
FIG. 11 illustrates a second procedure for a UE autonomously activating a subset of configured TCI states and/or spatial relation configurations in accordance with one or more aspects of the present disclosure.

FIG. 11 illustrates a second procedure 1100 for a UE autonomously activating a subset of configured TCI states and/or spatial relation configurations in accordance with one or more aspects of the present disclosure. The second procedure 1100 may involve a UE 1150 and a network entity 1152. In an aspect, the UE 1150 may include a device communications manager 1198 configured to perform the operations described above with respect to the device communications manager 198 of FIG. 1 and/or the device communications manager 298 of FIG. 2. Moreover, the network entity 1152 may include a network entity communications manager 1199 configured to perform the operations described above with respect to the network entity communications manager 199 of FIG. 1 and/or the network entity communications manager 299 of FIG. 2. The second procedure 1100 is similar to the first procedure 1000 described with respect to FIG. 10 but with some variation. Operations performed at blocks/instances 1002, 1004, 1006, 1008, 1010, 1012, 1018, and 1020 of the first procedure 1000 in FIG. 10 correspond to the operations performed at blocks/instances 1102, 1104, 1106, 1108, 1110, 1112, 1114, 1118, and 1120 of the second procedure 1100 in FIG. 11.

At block 1106, the UE 1150 measures the signal strengths of network entity transmit beams 5 and 6 via a UE receive beam R1. Thereafter, at 1108, the UE sends a report (e.g., message, information, signaling, etc.) to the network entity 1152 of the measured signal strengths, which indicate activated TCI states and/or spatial relation configurations corresponding to the tracked/measured network entity transmit beams 5 and 6. In an aspect, the report sent at 1108 may include multiple parts. A first part of the report may include an indication of the network entity transmit beams the UE is presently tracking/measuring (e.g., an indication of the network entity transmit beams 5 and 6) and a second part of the report may include an indication of the network entity transmit beams the UE will be tracking/measuring after some time. For example, the second part of the report may include an indication of the network entity transmit beams 3 and 4 that the UE will track/measure after a delay from the sending of the report has elapsed. As such, there is no need to send a second report at 1116, and therefore, latency and overhead is further reduced by the second procedure 1100 as compared to the first procedure 1000.

In more detail, at block 1106 of the second procedure 1100, the UE uses the UE receive beam R1 to track/measure the signal strengths of two network entity transmit beams (e.g., network entity transmit beams 5 and 6 if the UE is configured to track N=2 TCI states). At 1108, the UE sends the report (e.g., message, information, signaling, etc.) to the network entity of the measured signal strengths, which indicate the activated TCI states and/or spatial relation configurations corresponding to the tracked/measured network entity transmit beams 5 and 6. At 1110, after a first delay (Delay 1) from the sending of the report has elapsed, the network entity sends a message to the UE indicating a switch to one of the network entity transmit beams 5 or 6 corresponding to an activated TCI state or an activated spatial relation configuration. For example, the message may include information such as a spatial UE receive beam parameter corresponding to one of the network entity transmit beams 5 or 6. At block 1112, the UE may switch to a UE receive beam (e.g., UE receive beam R2) based on the spatial UE receive beam parameter indicated by the network entity to communicate signals with the network entity via one of the network entity transmit beams 5 or 6. For example, the UE may switch to the UE receive beam R2 to receive PDCCH/PDSCH from the network entity based on the activated TCI state, or to transmit PUCCH to the network entity based on the activated spatial relation configuration.

At block 1114, after a second delay (Delay 2) from the sending of the report has elapsed, the UE may change from communicating signals via the network entity transmit beam 5 or 6 to tracking/measuring the signal strengths of the network entity transmit beams 3 and 4. At 1118, after a third delay (Delay 3) from the sending of the report has elapsed, the network entity sends a message to the UE indicating a switch to one of the network entity transmit beams 3 or 4 corresponding to an activated TCI state or an activated spatial relation configuration. For example, the message may include information such as a spatial UE receive beam parameter corresponding to one of the network entity transmit beams 3 or 4. At block 1120, the UE may switch to a UE receive beam (e.g., UE receive beam R3) based on the spatial UE receive beam parameter indicated by the network entity to communicate signals with the network entity via one of the network entity transmit beams 3 or 4. For example, the UE may switch to the UE receive beam R3 to receive PDCCH/PDSCH from the network entity based on the activated TCI state, or to transmit PUCCH to the network entity based on the activated spatial relation configuration. Hence, overall delay is reduced as compared to the first procedure 1000 because the network entity is made ready to communicate signals earlier by informing the network entity earlier of which network entity transmit beams the UE is tracking.

In an aspect, the report of the second procedure 1100 includes current beam tracking information and future beam tracking information. In an aspect, the report may also include a value of the second delay (Delay 2) and a value of the third delay (Delay 3). In an aspect, the first delay (Delay 1), the second delay (Delay 2), and/or the third delay (Delay 3) are configured by the network entity (e.g., via RRC configuration). In an aspect, the first delay (Delay 1), the second delay (Delay 2), and/or the third delay (Delay 3) are based on a capability of the UE. In an aspect, the value of the third delay (Delay 3) is not included in the report to the network entity if the value was configured by the network entity.

Figure 12:
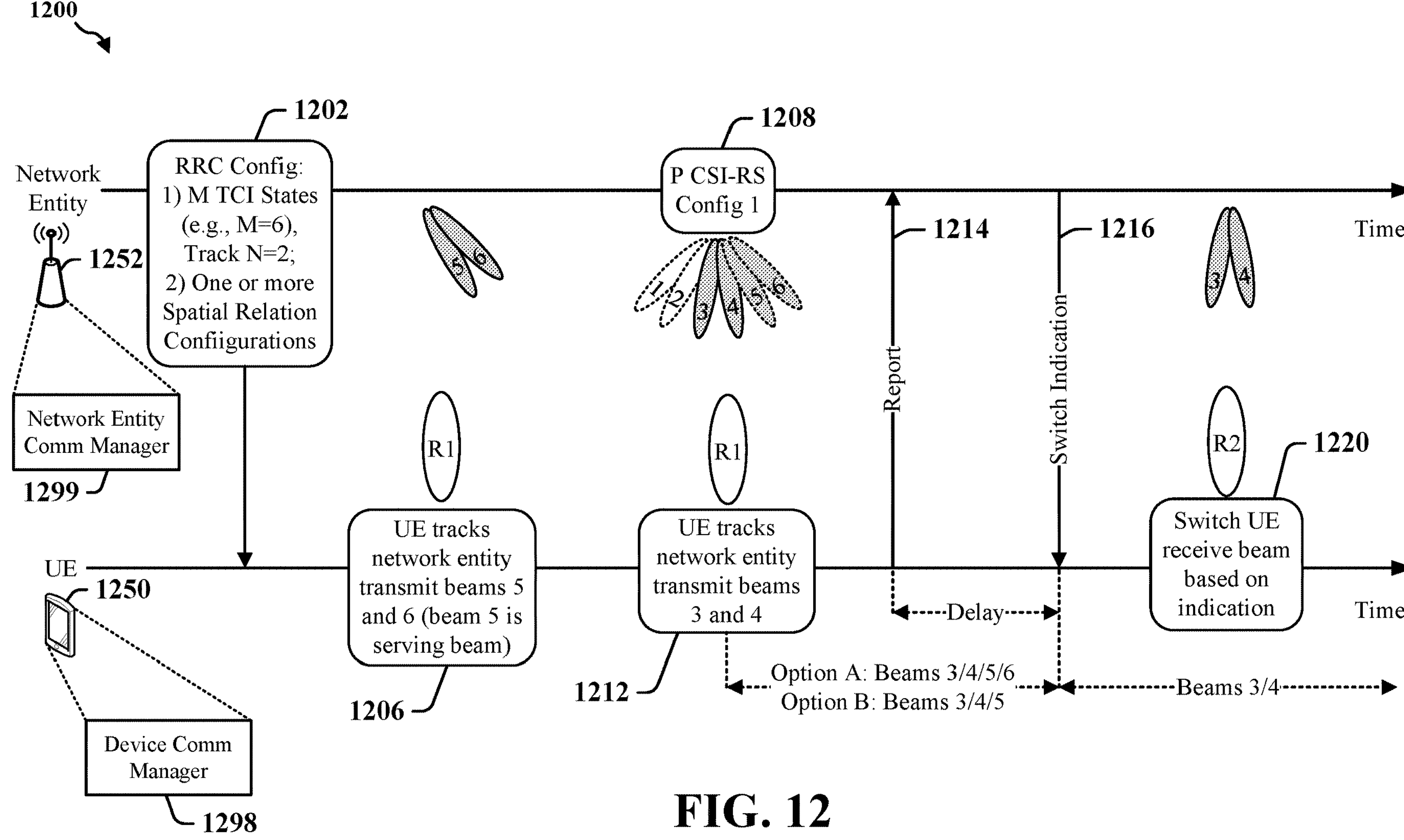
FIG. 12 illustrates a third procedure for a UE autonomously activating a subset of configured ICI states and/or spatial relation configurations in accordance with one or more aspects of the present disclosure.

FIG. 12 illustrates a third procedure 1200 for a UE autonomously activating a subset of configured TCI states and/or spatial relation configurations in accordance with one or more aspects of the present disclosure. The third procedure 1200 may involve a UE 1250 and a network entity 1252. In an aspect, the UE 1250 may include a device communications manager 1298 configured to perform the operations described above with respect to the device communications manager 198 of FIG. 1 and/or the device communications manager 298 of FIG. 2. Moreover, the network entity 1252 may include a network entity communications manager 1299 configured to perform the operations described above with respect to the network entity communications manager 199 of FIG. 1 and/or the network entity communications manager 299 of FIG. 2.

At block 1202, the network entity 1252 may configure (e.g., via a higher layer or RRC configuration) the UE 1250 with a total of M TCI states, where M is an integer greater than 0 (e.g., M=6), and also configure the UE to track N TCI states, where N is an integer greater than 0 and less than M (e.g., N=2). M and N may be based on a capability of the UE. Additionally, or alternatively, the network entity may configure the UE with one or more spatial relation configurations (e.g., via a higher layer or RRC configuration).

At block 1206, the UE tracks/measures the signal strengths of two network entity transmit (e.g., network entity transmit beams 5 and 6) using a UE receive beam R1. Here, the network entity transmit beams 5 and 6 were previously activated (correspond to an activated TCI state or an activated spatial relation configuration). Moreover, the network entity transmit beam 5 is a serving beam. In an aspect, a serving beam refers to a beam that is selected to currently serve a communication or interaction between the UE and the network entity.

At block 1208, the network entity may transmit reference signals based on a reference signal configuration (e.g., via a first periodic CSI-RS configuration (P CSI-RS Config 1)). In the example shown, P CSI-RS Config 1 includes six network entity transmit beams, wherein four network entity transmit beams are transmitted (e.g., network entity transmit beams 3, 4, 5, and 6) and two network entity transmit beams are not transmitted (e.g., network entity transmit beams 1 and 2).

After some time, the UE may learn that higher quality signaling is available on other beams (e.g., network entity transmit beams 3 and 4). Accordingly, at block 1212, using a UE receive beam (e.g., UE receive beam R1), the UE may change from tracking/measuring the signal strengths of the network entity transmit beams 5 and 6 to tracking/measuring the signal strengths of the network entity transmit beams 3 and 4. Thereafter, at 1214, the UE may send a report to the network entity of the measured signal strengths, which indicate the activated TCI states and/or spatial relation configurations corresponding to the tracked/measured network entity transmit beams 3 and 4. At 1216, after a delay from the sending of the report has elapsed, the network entity sends a message to the UE indicating a switch to one of the network entity transmit beams 3 or 4 corresponding to an activated TCI state or an activated spatial relation configuration. For example, the message may include information such as a spatial UE receive beam parameter corresponding to one of the network entity transmit beams 3 or 4. At block 1220, the UE may switch to a UE receive beam (e.g., UE receive beam R2) based on the spatial UE receive beam parameter indicated by the network entity to communicate signals with the network entity via one of the network entity transmit beams 3 or 4. For example, the UE may switch to the UE receive beam R2 to receive PDCCH/PDSCH from the network entity based on the activated TCI state, or to transmit PUCCH to the network entity based on the activated spatial relation configuration.

In an aspect, between the point where the UE tracks/measures the signal strengths of the network entity transmit beams 3 and 4 at 1212 and the point where the UE receives the beam switch indication from the network entity at 1216, the UE may maintain an active state of all, or a subset of, the network entity transmit beams that were active prior to the tracking/signal strength measurement at 1212. For example, after the UE begins tracking/measuring the signal strengths of the network entity transmit beams 3 and 4 (at 1212) but before the UE receives the beam switch indication (at 1216) or switches to the receive beam R2 (at 1220) for communication with the network entity via the network entity transmit beam 3 or the network entity transmit beam 4, the UE may maintain an active state of the network entity transmit beams 5 and 6, which had an activated TCI state or an activated spatial relation configuration prior to the tracking/signal strength measurement of the network entity transmit beams 3 and 4. Hence, the UE may track all network entity transmit beams 3, 4, 5, and 6 until the delay elapses, and thereafter, deactivate the network entity transmit beams 5 and 6 and switch to either of the network entity transmit beams 3 or 4 (at 1220).

In another aspect, between the point where the UE tracks/measures the signal strengths of the network entity transmit beams 3 and 4 at 1212 and the point where the UE receives the beam switch indication from the network entity at 1216, the UE may maintain an active state of a serving beam that was active prior to the tracking/signal strength measurement at 1212. For example, after the UE begins tracking/measuring the signal strengths of the network entity transmit beams 3 and 4 (at 1212) but before the UE receives the beam switch indication (at 1216) or switches to the UE receive beam R2 (at 1220) to communicate with the network entity via the network entity transmit beam 3 or the network entity transmit beam 4, the UE may maintain the active state of the serving network entity transmit beam 5, which had an activated TCI state or an activated spatial relation configuration prior to the tracking/signal strength measurement of the network entity transmit beams 3 and 4. Hence, the UE may track only the network entity transmit beams 3, 4, and 5 until the delay elapses, and thereafter, deactivate the serving network entity transmit beam 5 and switch to either of the network entity transmit beams 3 or 4 (at 1216).

Figure 13:
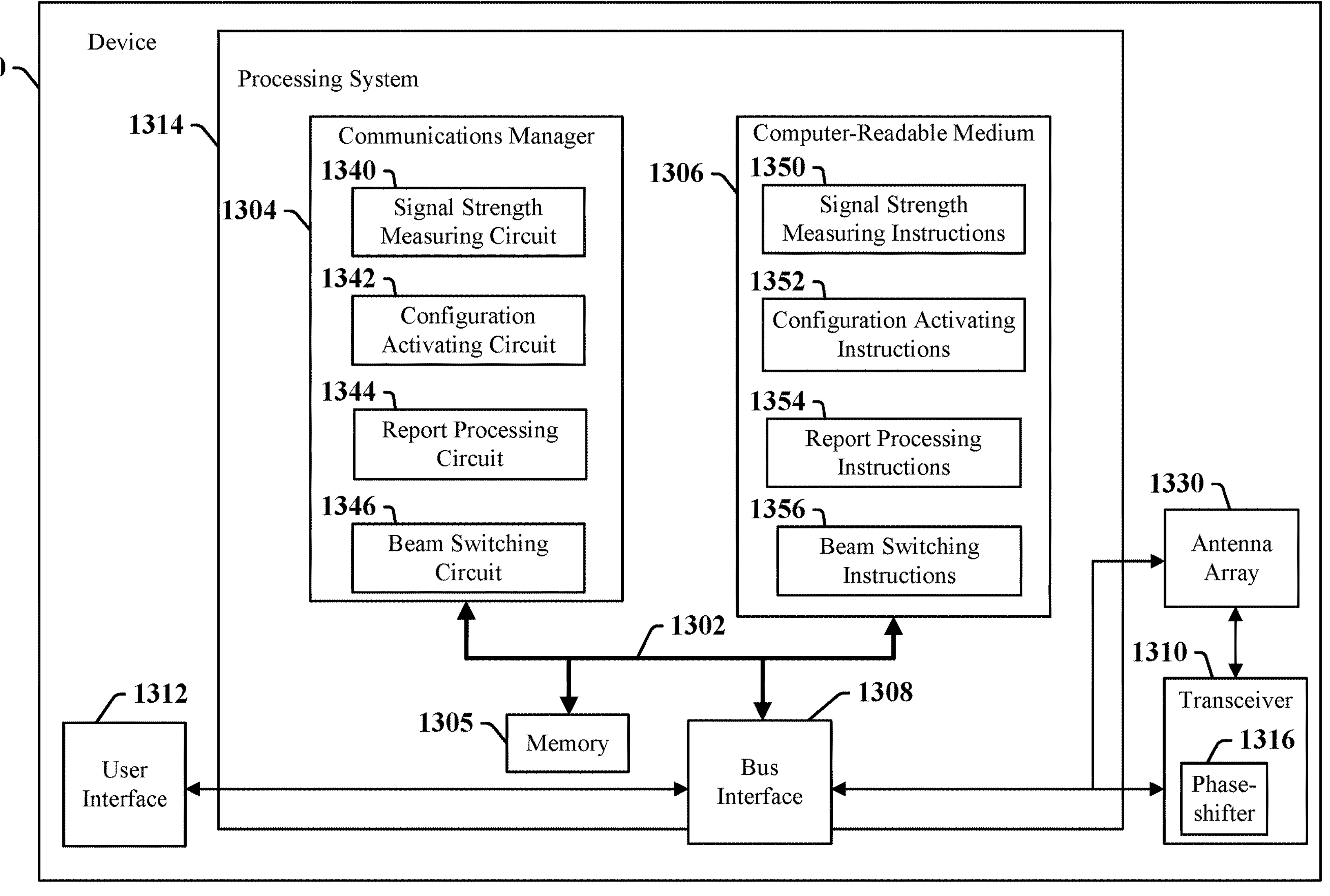
FIG. 13 is a block diagram illustrating an example of a hardware implementation for an exemplary device employing a processing system in accordance with one or more aspects of the present disclosure.

FIG. 13 is a block diagram illustrating an example of a hardware implementation for an exemplary device 1300 employing a processing system 1314. For example, the device 1300 may be a UE, as illustrated in any one or more of FIGS. 1, 2, and 4-12. The device 1300 may be implemented with a processing system 1314 that includes one or more processors 1304 (e.g., communications manager). Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 1300 may be configured to perform any one or more of the functions described herein. That is, the processor 1304, as utilized in a device 1300, may include the device communications manager 198/298/498 and used to implement any one or more of the processes and procedures described below and illustrated its FIGS. 14A and 14B.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. In some examples, the transceiver 1310 may include a phase-shifter 1316 for digital and/or analog beamforming via one or more antenna array(s) 1330. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 (e.g., device communications manager 198/298/498) may include signal strength measuring circuitry 1340 configured for various functions, including, for example, measuring, via one or more device receive beams, one or more signal strengths of one or more network entity transmit beams of a plurality of network entity transmit beams and measuring, via the one or more device receive beams, the one or more signal strengths of one or more other network entity transmit beams after a second delay from the outputting of the report has elapsed. For example, the signal strength measuring circuitry 1340 may be configured to implement one or more of the functions described below in relation to FIGS. 14A and 14B, including, e.g., blocks 1402 and 1416. The processor 1304 may also include configuration activating circuitry 1342 configured for various functions, including, for example, activating one or more transmission configuration indicator (TCI) states or one or more spatial relation configurations corresponding to the one or more network entity transmit beams based on the measured one or more signal strengths, maintaining an active state of at least one network entity transmit beam of the plurality of network entity transmit beams corresponding to an activated TCI state or an activated spatial relation configuration prior to the measuring of the one or more signal strengths, deactivating the at least one network entity transmit beam after a delay from the outputting of the report has elapsed, and activating one or more other TCI states or one or more other spatial relation configurations corresponding to the one or more other network entity transmit beams based on the measured one or more other signal strengths. For example, the configuration activating circuitry 1342 may be configured to implement one or more of the functions described below in relation to FIGS. 14A and 14B, including, e.g., blocks 1404, 1408, 1410, and 1418. The processor 1304 may also include report processing circuitry 1344 configured for various functions, including, for example, outputting a report indicating the one or more activated TCI states or the one or more activated spatial relation configurations. For example, the report processing circuitry 1344 may be configured to implement one or more of the functions described below in relation to FIGS. 14A and 14B, including, e.g., block 1406. The processor 1304 may also include beam switching circuitry 1346 configured for various functions, including, for example, obtaining, from a network entity, information indicating a network entity transmit beam of the one or more network entity transmit beams corresponding to an activated TCI state or an activated spatial relation configuration, switching, based on the information, to at least one device receive beam of the one or more device receive beams that is associated with the indicated network entity transmit beam to communicate signals with the network entity, obtaining, from the network entity, other information indicating another network entity transmit beam of the one or more network entity transmit beams corresponding to another activated TCI state or another activated spatial relation configuration after a third delay from the outputting of the report has elapsed, and switching, based on the other information, to the at least one device receive beam or at least one other device receive beam of the one or more device receive beams that is associated with the indicated other network entity transmit beam to communicate signals with the network entity. For example, the beam switching circuitry 1346 may be configured to implement one or more of the functions described below in relation to FIGS. 14A and 14B, including blocks 1412, 1414, 1420, and 1422.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include signal strength measuring instructions 1350 configured for various functions, including, for example, measuring, via one or more device receive beams, one or more signal strengths of one or more network entity transmit beams of a plurality of network entity transmit beams and measuring, via the one or more device receive beams, the one or more signal strengths of one or more other network entity transmit beams after a second delay from the outputting of the report has elapsed. For example, the signal strength measuring instructions 1350 may be configured to implement one or more of the functions described below in relation to FIGS. 14A and 14B, including, e.g., blocks 1402 and 1416. The computer-readable storage medium 1306 may also include configuration activating instructions 1352 configured for various functions, including, for example, activating one or more transmission configuration indicator (TCI) states or one or more spatial relation configurations corresponding to the one or more network entity transmit beams based on the measured one or more signal strengths, maintaining an active state of at least one network entity transmit beam of the plurality of network entity transmit beams corresponding to an activated TCI state or an activated spatial relation configuration prior to the measuring of the signal strength, deactivating the at least one network entity transmit beam after a delay from the outputting of the report has elapsed, and activating one or more other TCI states or one or more other spatial relation configurations corresponding to the one or more other network entity transmit beams based on the measured one or more other signal strengths. For example, the configuration activating instructions 1352 may be configured to implement one or more of the functions described below in relation to FIGS. 14A and 14B, including, e.g., blocks 1404, 1408, 1410, and 1418. The computer-readable storage medium 1306 may also include report processing instructions 1354 configured for various functions, including, for example, outputting a report indicating the one or more activated TCI states or the one or more activated spatial relation configurations. For example, the report processing instructions 1354 may be configured to implement one or more of the functions described below in relation to FIGS. 14A and 14B, including, e.g., block 1406. The computer-readable storage medium 1306 may also include beam switching instructions 1356 configured for various functions, including, for example, obtaining, from a network entity, information indicating a network entity transmit beam of the one or more network entity transmit beams corresponding to an activated TCI state or an activated spatial relation configuration, switching, based on the information, to at least one device receive beam of the one or more device receive beams that is associated with the indicated network entity transmit beam to communicate signals with the network entity, obtaining, from the network entity, other information indicating another network entity transmit beam of the one or more network entity transmit beams corresponding to another activated TCI state or another activated spatial relation configuration after a third delay from the outputting of the report has elapsed, and switching, based on the other information, to the at least one device receive beam or at least one other device receive beam of the one or more device receive beams that is associated with the indicated other network entity transmit beam to communicate signals with the network entity. For example, the beam switching instructions 1356 may be configured to implement one or more of the functions described below in relation to FIGS. 14A and 14B, including blocks 1412, 1414, 1420, and 1422.

Figure 14B:
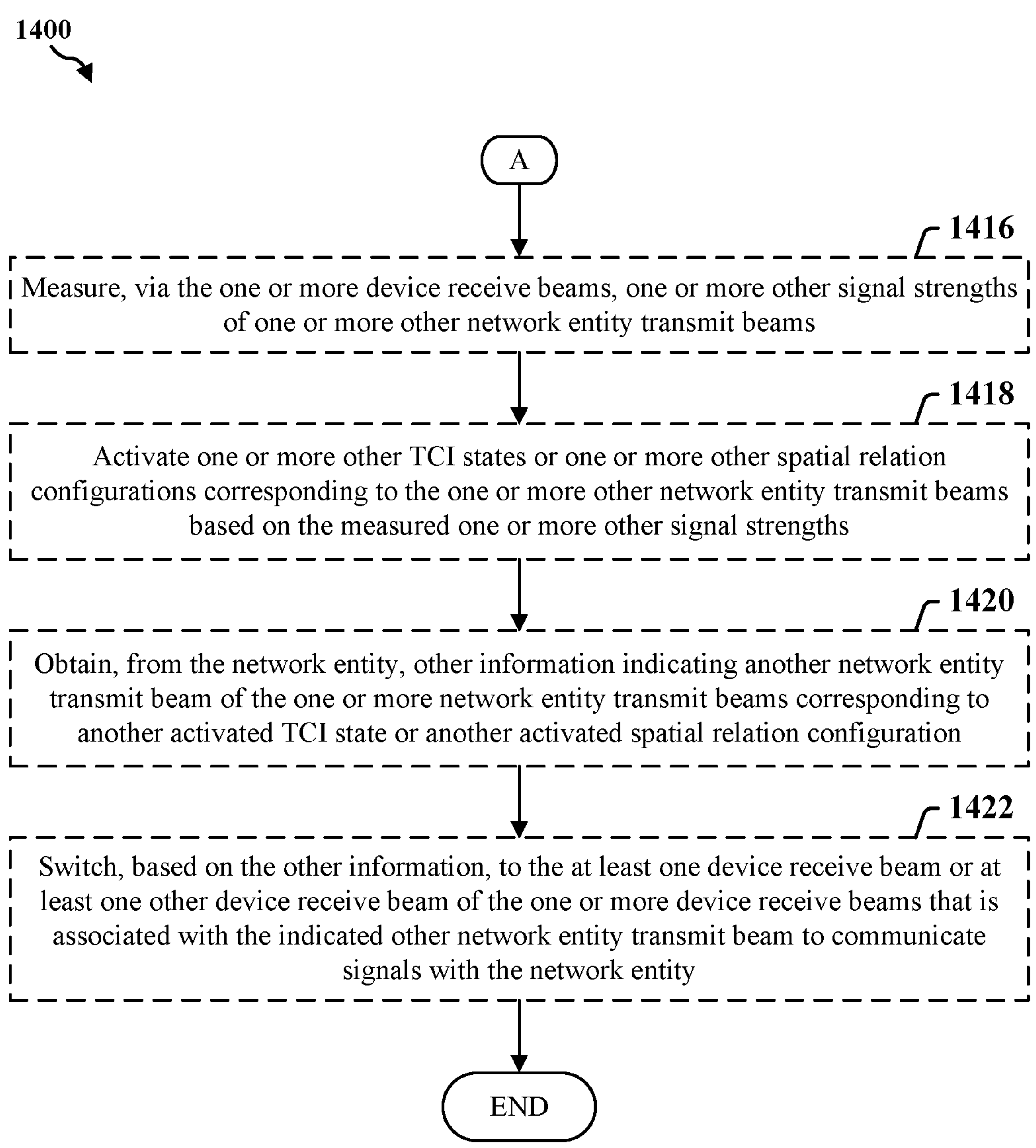

FIGS. 14A and 14B illustrate a flow chart of an exemplary process 1400 for a device (e.g., UE) initiated update of active transmission configuration indicator (TCI) states and/or spatial relation configurations in accordance with one or more aspects of the present disclosure. As described below, some or all illustrated features may be omitted in a particular implementation within the scope of the present disclosure, and some illustrated features may not be required for implementation of all aspects. In some examples, the process 1400 may be carried out by the device 1300 illustrated in FIG. 13, which may be a UE, as illustrated in any one or more ref FIGS. 1, 2, and 4-12. In some examples, the process 1400 may be carried out by any suitable apparatus or means for carrying out the functions or algorithm described below.

At block 1402, the device may measure, via one or more device receive beams, one or more signal strengths of one or more network entity transmit beams of a plurality of network entity transmit beams.

At block 1404, the device may activate one or more transmission configuration indicator (TCI) states or one or more spatial relation configurations corresponding to the one or more network entity transmit beams based on the measured one or more signal strengths. In an aspect, the one or more TCI states and the one or more spatial relation configurations are configured by a network entity (e.g., base station, gNB, CU, DU, and/or RU).

At block 1406, the device may output a report indicating the one or more activated TCI states or the one or more activated spatial relation configurations. In an aspect, the report includes the one or more signal strengths of the one or more network entity transmit beams, an indication of the one or more network entity transmit beams for which the one or more signal strengths is measured and/or an indication of the one or more device receive beams.

At block 1408, the device may maintain an active state of at least one network entity transmit beam of the plurality of network entity transmit beams corresponding to an activated TCI state or an activated spatial relation configuration prior to the measuring of the one or more signal strengths. In an aspect, the at least one network entity transmit beam is a serving beam. At block 1410, the device may deactivate the at least one network entity transmit beam after a delay from the outputting of the report has elapsed. In an aspect, the delay may be configured by the network entity anti/or based on a capability of the device.

At block 1412, the device may obtain, from the network entity, information indicating a network entity transmit beam of the one or mare network entity transmit beams corresponding to an activated TCI state or an activated spatial relation configuration. At block 1414, the device may switch, based on the information, to at least one device receive beam of the one or more device receive beam that is associated with the indicated network entity transmit beam to communicate signals with the network entity. In an aspect, the information is obtained after the delay from the outputting of the report has elapsed.

In an aspect, the report outputted by the device at block 1406 may also include an indication of one or more other network entity transmit beams of the plurality of network entity transmit beams for which one or more other signal strengths will be measured after a second delay from the outputting of the report has elapsed. Accordingly, at block 1416, the device may measure, via the one more device receive beams, the one or more other signal strengths of the one or more other network entity transmit beams after the second delay from the outputting of the report has elapsed.

At block 1418, the device may activate one or more other TCI states or one or more other spatial relation configurations corresponding to the one or more other network entity transmit beams based on the measured one or more other signal strengths. At block 1420, the device may obtain, from the network entity, other information indicating another network entity transmit beam of the one or more network entity transmit beams corresponding to another activated TCI state or another activated spatial relation configuration after a third delay from the outputting of the report has elapsed. At block 1422, the device may switch, based on the other information, to the at least one device receive beam or at least one other device receive beam of the one or more device receive beams that is associated with the indicated other network entity transmit beam to communicate signals with the network entity.

In an aspect, the second delay and the third delay may be configured by the network entity and/or based on a capability of the device. In an aspect, the report outputted by the device at block 1406 may further include a value of the second delay and/or a value of the third delay.

In one configuration, the device 1300 (e.g., UE) for wireless communication includes means for measuring (e.g., signal strength measuring circuitry 1340, transceiver 1310, and/or antenna array 1330), via one or more device receive beams, one or more signal strengths of one or more network entity transmit beams of a plurality of network entity transmit beams, means for activating (e.g., configuration activating circuitry 1342) one or more transmission configuration indicator (TCI) states or one or more spatial relation configurations corresponding to the one or more network entity transmit beams based on the measured one or more signal strengths, means for outputting (e.g., report processing circuitry 1344, transceiver 1310, and/or antenna array 1330) a report indicating the one or more activated TCI states or the one or more activated spatial relation configurations, means for obtaining (e.g., configuration activating circuitry 1342, beam switching circuitry 1346, transceiver 1310, and/or antenna array 1330), from a network entity, information indicating a network entity transmit beam of the one or more network entity transmit beams corresponding to an activated TCI state or an activated spatial relation configuration, means for switching (e.g., beam switching circuitry 1346, transceiver 1310, and/or antenna array 1330), based on the information, to at least one device receive beam of the one or more device receive beams that is associated with the indicated network entity transmit beam to communicate signals with the network entity, means for measuring (e.g., signal strength measuring circuitry 1340, transceiver 1310, and/or antenna array 1330), via the one or more device receive beams, the one or more other signal strengths of the one or more other network entity transmit beams after the second delay from the outputting of the report has elapsed, means for activating (e.g., configuration activating circuitry 1342) one or more other TCI states or one or more other spatial relation configurations corresponding to the one or more other network entity transmit beams based on the measured one or more other signal strengths, means for obtaining (e.g., configuration activating circuitry 1342, beam switching circuitry 1346, transceiver 1310, and/or antenna array 1330), from the network entity, other information indicating another network entity transmit beam of the one or more network entity transmit beams corresponding to another activated TCI state or another activated spatial relation configuration after a third delay from the outputting of the report has elapsed, means for switching (e.g., beam switching circuitry 1346, transceiver 1310, and/or antenna array 1330), based on the information, to the at least one device receive beam or at least one other device receive beam of the one or more other device receive beams that is associated with the indicated other network entity transmit beam to communicate signals with the network entity, means for maintaining (e.g., configuration activating circuitry 1342) an active state of at least one network entity transmit beam of the plurality of network entity transmit beams corresponding to an activated TCI state or an activated spatial relation configuration prior to the measuring of the one or more signal strengths, and means for deactivating (e.g., configuration activating circuitry 1342) the at least one network entity transmit beam after a delay from the outputting of the report has elapsed. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one or more of FIGS. 1, 2, and 4-12 and utilizing, for example, the processes and/or algorithms described herein in relation to FIGS. 14A and 14B.

Figure 15:
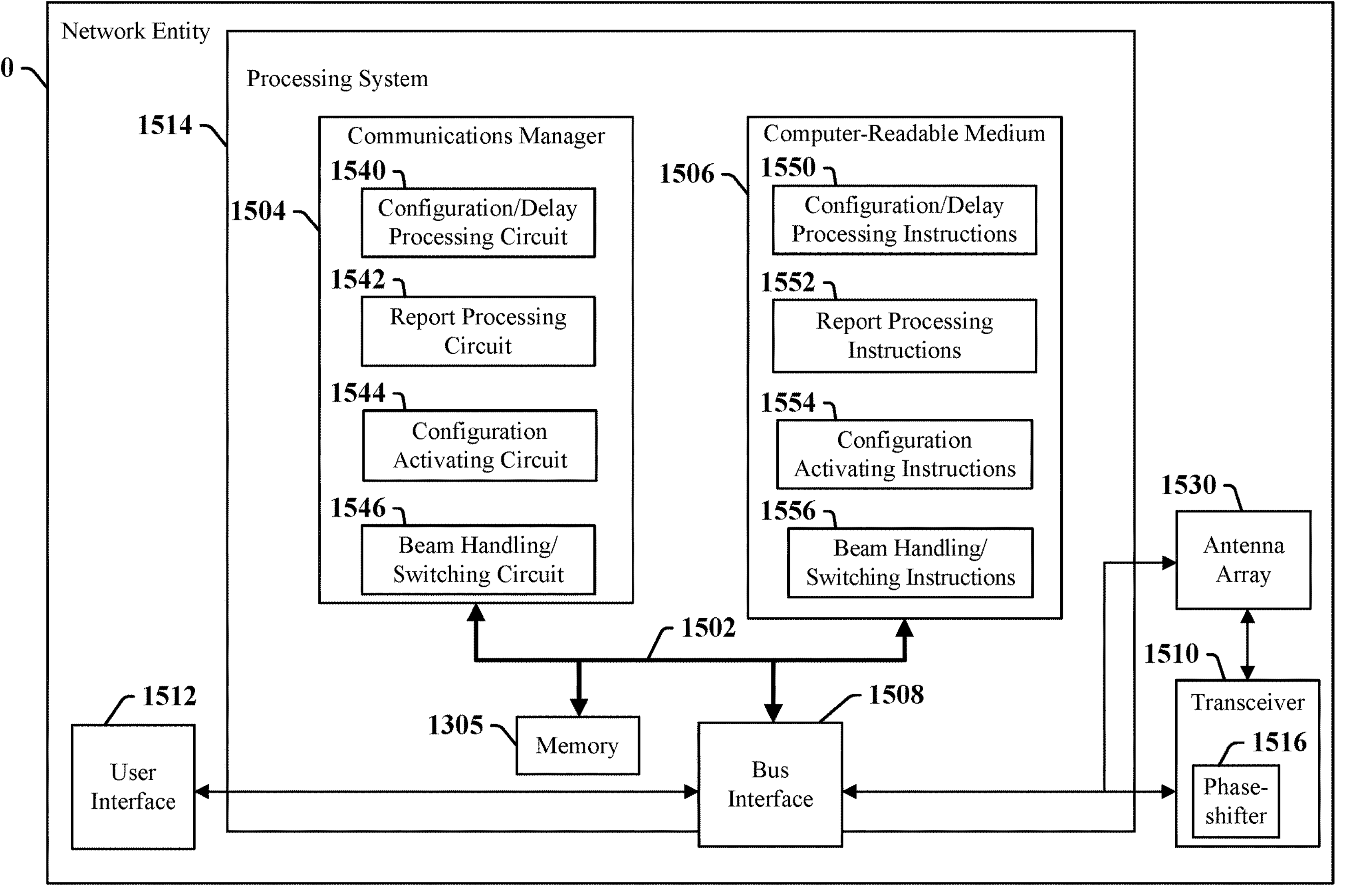
FIG. 15 is a block diagram illustrating an example of a hardware implementation for an exemplary network entity employing a processing system in accordance with one or more aspects of the present disclosure.

FIG. 15 is a block diagram illustrating an example of a hardware implementation for an exemplary network entity 1500 employing a processing system 1514. In accordance with various aspects of the disclosure, an element, or any portion of an element, or any combination of elements may be implemented with a processing system 1514 that includes one or more processors 1504 (e.g., communications manager). For example, the network entity 1500 may be a base station or gNB as illustrated in any one or more of FIGS. 1, 2, and 4-12, or a CU, DU, or RU.

The processing system 1514 may be substantially the same as the processing system 1314 illustrated in FIG. 13 including a bus interface 1508, a bus 1502, memory 1505, a processor 1504, and a computer-readable storage medium 1506. Furthermore, the network entity 1500 may include a user interface 1512, a transceiver 1510 (including a phase-shifter 1516), and one or more antenna arrays 1530 substantially similar to those described above in FIG. 13. The processor 1504, as utilized in a network entity 1500, may include the network entity communications manager 199/299/499 and used to implement any one or more of the processes described below and illustrated in FIGS. 16A and 16B.

In some aspects of the disclosure, the processor 1504 (e.g., network entity communications manager 199/299/499) may include configuration/delay processing circuitry 1540 configured for various functions, including, for example, configuring one or more transmission configuration indicator (TCI) states and/or one or more spatial relation configurations and configuring one or more delays. For example, the configuration/delay processing circuitry 1540 may be configured to implement one or more of the functions described below in relation to FIGS. 16A and 16B, including, e.g., blocks 1602 and 1604. The processor 1504 may further include report processing circuitry 1542 configured for various functions, including, for example, obtaining a report indicating one or more transmission configuration indicator (TCI) states or one or more spatial relation configurations corresponding to one or more network entity transmit beams of a plurality of network entity transmit beams output from the network entity. For example, the report processing circuitry 1542 may be configured to implement one or more of the functions described below in relation to FIGS. 16A and 16B, including, e.g., block 1608. The processor 1504 may further include configuration activating circuitry 1544 configured for various functions, including, for example, activating the one or more TCI states or the one or more spatial relation configurations corresponding to the one or more network entity transmit beams and activating one or more other TCI states or one or more other spatial relation configurations corresponding to one or more other network entity transmit beams of the plurality of network entity transmit beams. For example, the configuration activating circuitry 1544 may be configured to implement one or more of the functions described below in relation to FIGS. 16A and 16B, including, e.g., blocks 1610 and 1616. The processor 1504 may further include beam handling/switching circuitry 1546 configured for various functions, including, for example, outputting a plurality of network entity transmit beams, providing, to a device, information indicating a network entity transmit beam of the one or more network entity transmit beams corresponding to an activated TCI state or an activated spatial relation configuration, switching to the indicated network entity transmit beam to communicate signals with the device, providing, to the device, other information indicating another network entity transmit beam of the one or more network entity transmit beams corresponding to another activated TCI state or another activated spatial relation configuration after a third delay from the obtaining of the report has elapsed, and switching to the indicated other network entity transmit beam to communicate signals with the device. For example, the beam handling/switching circuitry 1546 may be configured to implement one or more of the functions described below in relation to FIGS. 16A and 16B, including, e.g., blocks 1606, 1612, 1614, 1618, and 1620.

In one or more examples, the computer-readable storage medium 1506 may include configuration/delay instructions 1550 configured for various functions, including, configuring one or more transmission configuration indicator (TCI) states and/or one or more spatial relation configurations and configuring one or more delays. For example, the configuration/delay instructions 1550 may be configured to implement one or more of the functions described below in relation to FIGS. 16A and 16B, including, e.g., blocks 1602 and 1604. The computer-readable storage medium 1506 may further include report processing instructions 1552 configured for various functions, including, for example, obtaining a report indicating one or more transmission configuration indicator (TCI) states or one or more spatial relation configurations corresponding to one or more network entity transmit beams of a plurality of network entity transmit beams output from the network entity. For example, the report processing instructions 1552 may be configured to implement one or more of the functions described below in relation to FIGS. 16A and 16B, including, e.g., block 1608. The computer-readable storage medium 1506 may further include configuration activating instructions 1554 configured for various functions, including, for example, activating the one or more TCI states or the one or more spatial relation configurations corresponding to the one or more network entity transmit beams and activating one or more other TCI states or one or more other spatial relation configurations corresponding to one or more other network entity transmit beams of the plurality of network entity transmit beams. For example, the configuration activating instructions 1554 may be configured to implement one or more of the functions described below in relation to FIGS. 16A and 16B, including, e.g., blocks 1610 and 1616. The computer-readable storage medium 1506 may further include beam handling/switching instructions 1556 configured for various functions, including, for example, outputting a plurality of network entity transmit beams, providing, to a device, information indicating a network entity transmit beam of the one or more network entity transmit beams corresponding to an activated TCI state or an activated spatial relation configuration, switching to the indicated network entity transmit beam to communicate signals with the device, providing, to the device, other information indicating another network entity transmit beam of the one or more network entity transmit beams corresponding to another activated TCI state or another activated spatial relation configuration after a third delay from the obtaining of the report has elapsed, and switching to the indicated other network entity transmit beam to communicate signals with the device. For example, the beam handling/switching instructions 1556 may be configured to implement one or more of the functions described below in relation to FIGS. 16A and 16B, including, e.g., blocks 1606, 1612, 1614, 1618, and 1620.

Figure 16A:
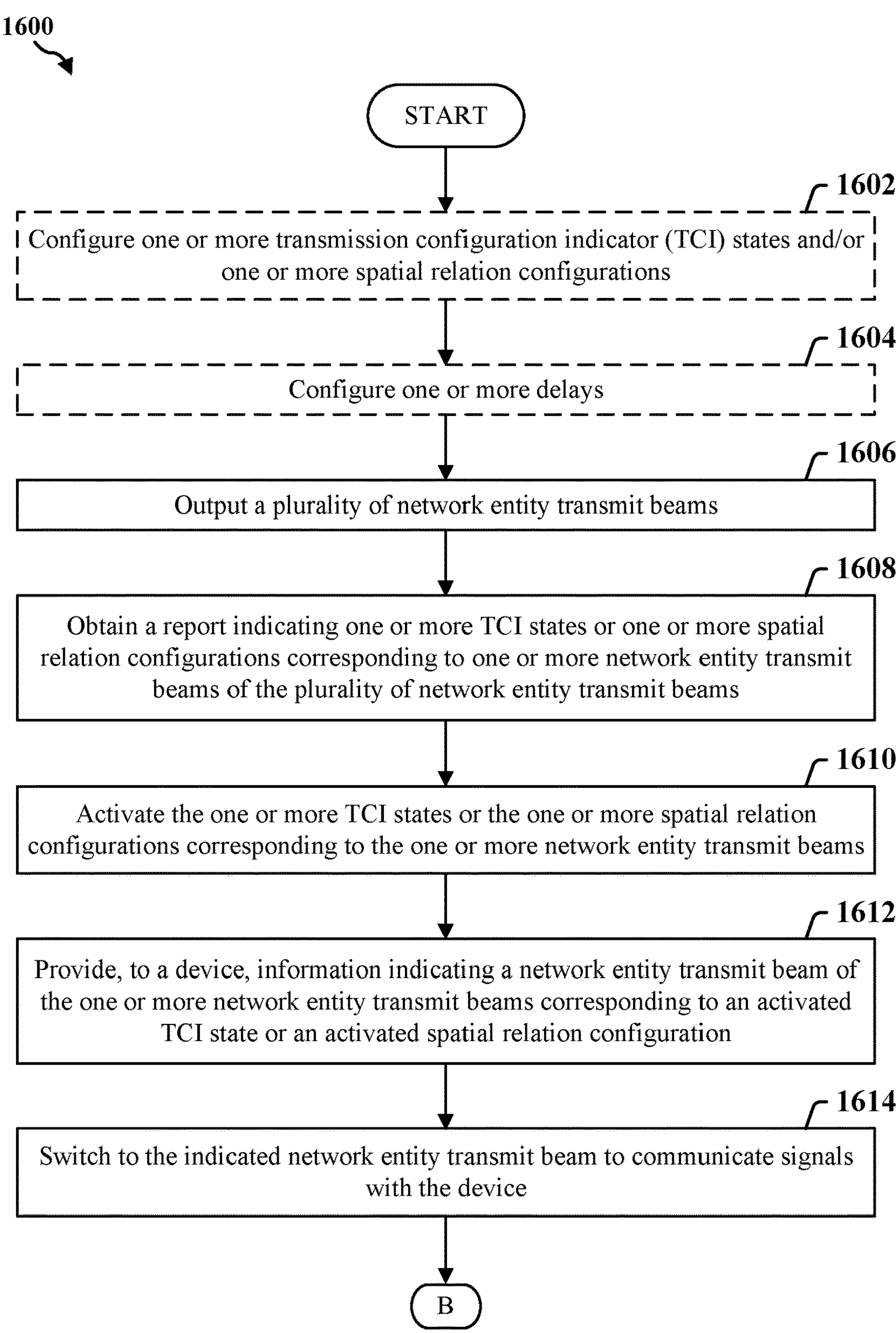
FIGS. 16A and 16B illustrate a flow chart of an exemplary process for a network entity handling an update of active transmission configuration indicator (TCI) states and/or spatial relation configurations in accordance with one or more aspects of the present disclosure.
Figure 16B:
Figure 16B:
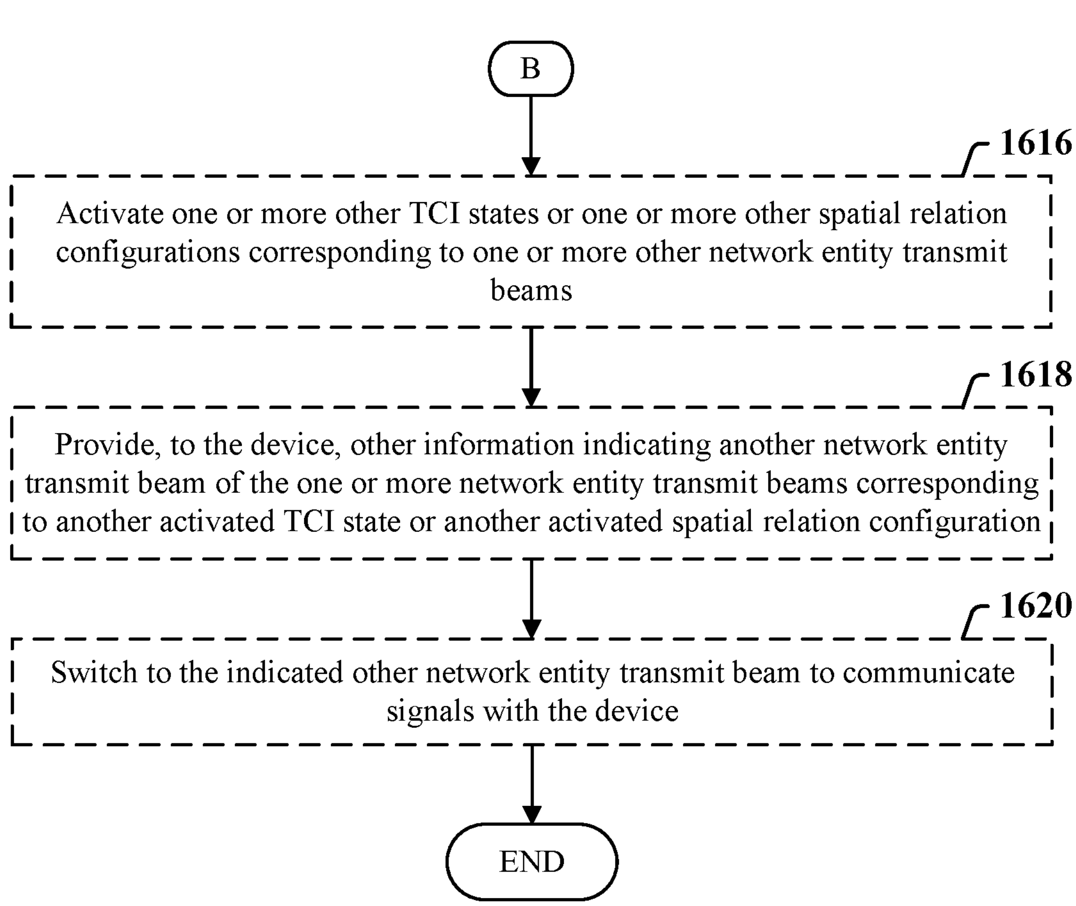

FIGS. 16A and 16B illustrate a flow chart of an exemplary process 1600 for a network entity handling an update of active transmission configuration indicator (TCI) states and/or spatial relation configurations in accordance with one or more aspects of the present disclosure. As described below, some or all illustrated features may be omitted in a particular implementation within the scope of the present disclosure, and some illustrated features may not be required for implementation of all aspects. In some examples, the process 1600 may be carried out by the network entity 1500 illustrated in FIG. 15, which may be a base station or gNB as illustrated in any one or more of FIGS. 1, 2, and 4-12, or a CU, DU, or RU. In some examples, the process 1600 may be carried out by any suitable apparatus or means for carrying out the functions or algorithm described below.

At block 1602, the network entity may configure one or more transmission configuration indicator (TCI) states and/ or one or more spatial relation configurations. At block 1604, the network entity may configure one or more delays.

At block 1606, the network entity may output a plurality of network entity transmit beams. At block 1608, the network entity may obtain a report indicating one or more transmission configuration indicator (TCI) states or one or more spatial relation configurations corresponding to one or more network entity transmit beams of the plurality of network entity transmit beams. In an aspect, the report may include an indication of the one or more network entity transmit beams for which one or more signal strengths is measured at a device, the one or more signal strengths of the one or more network entity transmit beams, and/or an indication of one or more device receive beams used to measure the one or more signal strengths at the device (e.g., UE).

At block 1610, the network entity may activate the one or more TCI states or the one or more spatial relation configurations corresponding to the one or more network entity transmit beams. At block 1612, the network entity may provide, to the device, information indicating a network entity transmit beam of the one or more network entity transmit beams corresponding to an activated TCI state or an activated spatial relation configuration. At block 1614, the network entity may switch to the indicated network entity transmit beam to communicate signals with the device. In an aspect, the information is provided after a delay from the obtaining of the report has elapsed. The delay may be configured by the network entity and/or based on a capability of the device.

In an aspect, the report includes an indication of one or more other network entity transmit beams for which one or more other signal strengths will be measured at the device after a second delay from the obtaining of the report has elapsed. Accordingly, at block 1616, the network entity may activate one or more other TCI states or one or more other spatial relation configurations corresponding to the one or more other network entity transmit beams.

At block 1618, the network entity may provide, to the device, other information indicating another network entity transmit beam of the one or more network entity transmit beams corresponding to another activated TCI state or another activated spatial relation configuration after a third delay from the obtaining of the report has elapsed. At block 1620, the network entity may switch to the indicated other network entity transmit beam to communicate signals with the device. In an aspect, the second delay and the third delay are configured by the network entity and/or based on a capability of the device. In an aspect, the report obtained at block 1608 may include a value of the second delay and/or a value of the third delay.

In one configuration, the network entity 1500 (e.g., base station, gNB, CU, DU, or RU) includes means for configuring (e.g., configuration/delay processing circuitry 1540) one or more transmission configuration indicator (TCI) states and/or one or more spatial relation configurations, means for configuring (e.g., configuration/delay processing circuitry 1540) one or more delays, means for outputting (e.g., beam handling/switching circuitry 1546, transceiver 1510, and/or antenna array 1530) a plurality of network entity transmit beams, means for obtaining (e.g., report processing circuitry 1542, transceiver 1510, and/or antenna array 1530) a report indicating one or more transmission configuration indicator (TCI) states or one or more spatial relation configurations corresponding to one or more network entity transmit beams of the plurality of network entity transmit beams, means for activating (e.g., configuration activating circuitry 1544) the one or more TCI states or the one or more spatial relation configurations corresponding to the one or more network entity transmit beams, means for providing (e.g., configuration activating circuitry 1544, beam handling/switching circuitry 1546, transceiver 1510, and/or antenna array 1530), to a device, information indicating a network entity transmit beam of the one or more network entity transmit beams corresponding to an activated TCI state or an activated spatial relation configuration, means for switching (e.g., beam handling/switching circuitry 1546, transceiver 1510, and/or antenna array 1530) to the indicated network entity transmit beam to communicate signals with the device, means for activating (e.g., configuration activating circuitry 1544) one or more other TCI states or one or more other spatial relation configurations corresponding to the one or more other network entity transmit beams, providing (e.g., configuration activating circuitry 1544, beam handling/switching circuitry 1546, transceiver 1510, and/or antenna array 1530), to the device, other information indicating another network entity transmit beam of the one or more network entity transmit beams corresponding to another activated TCI state or another activated spatial relation configuration after a third delay from the obtaining of the report has elapsed, and means for switching (e.g., beam handling/switching circuitry 1546, transceiver 1510, and/or antenna array 1530) to the indicated other network entity transmit beam to communicate signals with the device. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one or more of FIGS. 1, 2, and 4-12 and utilizing, for example, the processes and/or algorithms described herein in relation to FIGS. 16A and 16B.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

One or more of the components, steps, features and/or functions illustrated in FIGS. 1-16B may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-16B may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of wireless communication at a device, comprising: measuring, via one or more device receive beams, one or more signal strengths of one or more network entity transmit beams of a plurality of network entity transmit beams; activating one or more transmission configuration indicator (TCI) states or one or more spatial relation configurations corresponding to the one or more network entity transmit beams based on the measured one or more signal strengths; and outputting a report indicating the one or more activated TCI states or the one or more activated spatial relation configurations.

Aspect 2: The method of aspect 1, wherein the one or more TCI states and the one or more spatial relation configurations are configured by a network entity.

Aspect 3: The method of aspect 1 or 2, further comprising: obtaining, from a network entity, information indicating a network entity transmit beam of the one or more network entity transmit beams corresponding to an activated TCI state or an activated spatial relation configuration; and switching, based on the information, to at least one device receive beam of the one or more device receive beams that is associated with the indicated network entity transmit beam to communicate signals with the network entity.

Aspect 4: The method of aspect 3, wherein the information is obtained after a delay from the outputting of the report has elapsed.

Aspect 5: The method of aspect 4, wherein the delay is at least one of: configured by the network entity; or based on a capability of the device.

Aspect 6: The method of aspect 4, wherein the report comprises at least one of: the one or more signal strengths of the one or more network entity transmit beams; an indication of the one or more network entity transmit beams for which the one or more signal strengths is measured; or an indication of the one or more device receive beams.

Aspect 7: The method of any one of aspects 4 through 6, wherein the report comprises: an indication of one or more other network entity transmit beams of the plurality of network entity transmit beams for which one or more other signal strengths will be measured after a second delay from the outputting of the report has elapsed.

Aspect 8: The method of aspect 7, further comprising: measuring, via the one or more device receive beams, the one or more other signal strengths of the one or more other network entity transmit beams after the second delay from the outputting of the report has elapsed; and activating one or more other TCI states or one or more other spatial relation configurations corresponding to the one or inure other network entity transmit beams based on the measured one or more other signal strengths.

Aspect 9: The method of aspect 8, further comprising: obtaining, from the network entity, other information indicating another network entity transmit beam of the one or more network entity transmit beams corresponding to another activated TCI state or another activated spatial relation configuration after a third delay from the outputting of the report has elapsed; and switching, based on the other information, to the at least one device receive beam or at least one other device receive beam of the one or more device receive beams that is associated with the indicated other network entity transmit beam to communicate signals with the network entity.

Aspect 10: The method of aspect 9, wherein the second delay and the third delay are at least one of: configured by the network entity; or based on a capability of the device.

Aspect 11: The method of aspect 9 or 10, wherein the report comprises at least one of: a value of the second delay; or a value of the third delay.

Aspect 12: The method of any one of aspects 1 through 11, further comprising: maintaining an active state of at least one network entity transmit beam of the plurality of network entity transmit beams corresponding to an activated TCI state or an activated spatial relation configuration prior to the measuring of the one or more signal strengths; and deactivating the at least one network entity transmit beam after a delay from the outputting of the report has elapsed.

Aspect 13: The method of aspect 12, wherein the at least one network entity transmit beam is a serving beam.

Aspect 14: A device comprising at least one processor, and a memory coupled to the at least one processor, the at least one processor configured to perform a method of any one of aspects 1 through 13.

Aspect 15: A device comprising at least one means for performing a method of any one of aspects 1 through 13.

Aspect 16: A non-transitory computer-readable medium storing code at a device, the code comprising instructions executable by a processor to perform a method of any one of aspects 1 through 13.

Aspect 17: A method of wireless communication at a network entity, comprising: outputting a plurality of network entity transmit beams; obtaining a report indicating one or more transmission configuration indicator (TCI) states or one or more spatial relation configurations corresponding to one or more network entity transmit beams of the plurality of network entity transmit beams; and activating the one or more TCI states or the one or more spatial relation configurations corresponding to the one or more network entity transmit beams.

Aspect 18: The method of aspect 17, wherein the one or more TCI states and the one or more spatial relation configurations are configured by the network entity.

Aspect 19: The method of aspect 17 or 18, further comprising: providing, to a device, information indicating a network entity transmit beam of the one or more network entity transmit beams corresponding to an activated TCI state or an activated spatial relation configuration; and switching to the indicated network entity transmit beam to communicate signals with the device.

Aspect 20: The method of aspect 19, wherein the information is provided after a delay from the obtaining of the report has elapsed.

Aspect 21: The method of aspect 20, wherein the delay is at least one of: configured by the network entity; or based on a capability of the device.

Aspect 22: The method of aspect 20, wherein the report comprises at least one of: an indication of the one or more network entity transmit beams for which one or more signal strengths is measured at the device; the one or more signal strengths of the one or more network entity transmit beams; or an indication of one or more device receive beams used to measure the one or more signal strengths at the device.

Aspect 23: The method of any one of aspects 20 through 22, wherein the report comprises: an indication of one or more other network entity transmit beams for which one or more other signal strengths will be measured at the device after a second delay from the obtaining of the report has elapsed.

Aspect 24: The method of aspect 23, further comprising: activating one or more other TCI states or one or more other spatial relation configurations corresponding to the one or more other network entity transmit beams.

Aspect 25: The method of aspect 24, further comprising: providing, to the device, other information indicating another network entity transmit beam of the one or more network entity transmit beams corresponding to another activated TCI state or another activated spatial relation configuration after a third delay from the obtaining of the report has elapsed; and switching to the indicated other network entity transmit beam to communicate signals with the device.

Aspect 26: The method of aspect 25, wherein the second delay and the third delay are at least one of: configured by the network entity; or based on a capability of the device.

Aspect 27: The method of aspect 25 or 26, wherein the report comprises at least one of: a value of the second delay; or a value of the third delay.

Aspect 28: A network entity comprising at least one processor, and a memory coupled to the at least one processor, the at least one processor configured to perform a method of any one of aspects 17 through 27.

Aspect 29: A network entity comprising at least one means for performing a method of any one of aspects 17 through 27.

Aspect 30: A non-transitory computer-readable medium storing code at a network entity, the code comprising instructions executable by a processor to perform a method of any one of aspects 17 through 27.

The previous description is provided to enable any person skilled the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of hems refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A device for wireless communication, comprising:

a memory; and one or more processors coupled with the memory and configured to cause the device to:

measure, via one or more device receive beams, one or more signal strengths of one or more network entity transmit beams of a plurality of network entity transmit beams;

autonomously activate, at the device independent of obtaining an activation command, one or more transmission configuration indicator (TCI) states or one or more spatial relation configurations corresponding to the one or more network entity transmit beams based on the measured one or more signal strengths; and output a report that indicates the one or more TCI states or the one or more spatial relation configurations autonomously activated at the device independent of obtaining the activation command, wherein the report further comprises an indication of the one or more network entity transmit beams for which the one or more signal strengths is measured and an indication of one or more other network entity transmit beams of the plurality of network entity transmit beams, and wherein one or more other signal strengths of the one or more other network entity transmit beams will be measured subsequent to the output of the report.

2. The device of claim 1, wherein the one or more TCI states and the one or more spatial relation configurations are configured by a network entity.

3. The device of claim 1, wherein the one or more processors are further configured to cause the device to:

obtain, from a network entity, information that indicates a network entity transmit beam of the one or more network entity transmit beams corresponding to a TCI state or a spatial relation configuration autonomously activated at the device independent of obtaining the activation command; and switch, based on the information, to at least one device receive beam of the one or more device receive beams that are associated with the indicated network transmit beam to communicate signals with the network entity.

4. The device of claim 3, wherein the information is obtained after a delay from the output of the report has elapsed.

5. The device of claim 4, wherein the delay is at least one of:

configured by the network entity; or based on a capability of the device.

6. The device of claim 4, wherein the report comprises at least one of:

the one or more signal strengths of the one or more network entity transmit beams; or an indication of the one or more device receive beams.

7. The device of claim 6, wherein the one or more other signal strengths of the one or more other network entity transmit beams will be measured after a second delay from the output of the report has elapsed.

8. The device of claim 7, wherein the one or more processors are further configured to cause the device to:

measure, via the one or more device receive beams, the one or more other signal strengths of the one or more other network entity transmit beams after the second delay from the output of the report has elapsed; and autonomously activate, at the device independent of obtaining the activation command, one or more other TCI states or one or more other spatial relation configurations corresponding to the one or more other network entity transmit beams based on the measured one or more other signal strengths.

9. The device of claim 8, wherein the one or more processors are further configured to cause the device to:

obtain, from the network entity, other information that indicates another network entity transmit beam of the one or more network entity transmit beams corresponding to another activated TCI state or another activated spatial relation configuration after a third delay from the output of the report has elapsed; and switch, based on the other information, to the at least one device receive beam or at least one other device receive beam of the one or more device receive beams that are associated with the indicated other network entity transmit beam to communicate signals with the network entity.

10. The device of claim 9, wherein the second delay and the third delay are at least one of:

configured by the network entity; or based on a capability of the device.

11. The device of claim 9, wherein the report comprises at least one of:

a value of the second delay; or a value of the third delay.

12. The device of claim 1, wherein the one or more processors are further configured to cause the device to:

maintain an active state of at least one network entity transmit beam of the plurality of network entity transmit beams corresponding to an activated TCI state or an activated spatial relation configuration prior to the measurement of the one or more signal strengths; and deactivate the at least one network entity transmit beam after a delay from the output of the report has elapsed.

13. The device of claim 12, wherein the at least one network entity transmit beam is a serving beam.

14. A method of wireless communication at a device, comprising:

measuring, via one or more device receive beams, one or more signal strengths of one or more network entity transmit beams of a plurality of network entity transmit beams;

autonomously activating, at the device independent of obtaining an activation command, one or more transmission configuration indicator (TCI) states or one or more spatial relation configurations corresponding to the one or more network entity transmit beams based on the measured one or more signal strengths; and outputting a report that indicates the one or more TCI states or the one or more spatial relation configurations autonomously activated at the device independent of obtaining the activation command, wherein the report further comprises an indication of the one or more network entity transmit beams for which the one or more signal strengths is measured and an indication of one or more other network entity transmit beams of the plurality of network entity transmit beams, and wherein one or more other signal strengths of the one or more other network entity transmit beams will be measured subsequent to the output of the report.

15. The method of claim 14, further comprising:

obtaining, from a network entity, information indicating a network entity transmit beam of the one or more network entity transmit beams corresponding to a TCI state or a spatial relation configuration autonomously activated at the device independent of obtaining the activation command; and switching, based on the information, to at least one device receive beam of the one or more device receive beams that are associated with the indicated network entity transmit beam to communicate signals with the network entity.

16. The method of claim 14, wherein the report comprises at least one of:

the one or more signal strengths of the one or more network entity transmit beams; or an indication of the one or more device receive beams.

17. A network entity for wireless communication, comprising:

a memory; and one or more processors coupled with the memory and configured to cause the network entity to:

output a plurality of network entity transmit beams;

obtain a report that indicates one or more transmission configuration indicator (TCI) states or one or more spatial relation configurations that are enabled independent of an activation command from the network entity and correspond to one or more network entity transmit beams of the plurality of network entity transmit beams for which one or more signal strengths is measured, wherein the report further comprises an indication of the one or more network entity transmit beams for which the one or more signal strengths is measured and an indication of one or more other network entity transmit beams of the plurality of network entity transmit beams for which one or more other signal strengths will be measured subsequent to the obtainment of the report; and activate, at the network entity, the one or more TCI states or the one or more spatial relation configurations that are enabled independent of the activation command from the network entity and correspond to the one or more network entity transmit beams.

18. The network entity of claim 17, wherein the one or more TCI states and the one or more spatial relation configurations are configured by the network entity.

19. The network entity of claim 17, wherein the one or more processors are further configured to cause the network entity to:

provide, to a device, information that indicates a network entity transmit beam of the one or more network entity transmit beams corresponding to a TCI state or a spatial relation configuration that is enabled independent of the activation command from the network entity; and switch to the indicated network entity transmit beam to communicate signals with the device.

20. The network entity of claim 19, wherein the information is provided after a delay from the obtainment of the report has elapsed.

21. The network entity of claim 20, wherein the delay is at least one of:

configured by the network entity; or based on a capability of the device.

22. The network entity of claim 20, wherein the report comprises at least one of:

the one or more signal strengths of the one or more network entity transmit beams; or an indication of one or more device receive beams corresponding to the one or more signal strengths.

23. The network entity of claim 22, wherein the one or more other signal strengths will be measured after a second delay from the obtainment of the report has elapsed.

24. The network entity of claim 23, wherein the one or more processors are further configured to cause the network entity to:

activate one or more other TCI states or one or more other spatial relation configurations corresponding to the one or more other network entity transmit beams.

25. The network entity of claim 24, wherein the one or more processors are further configured to cause the network entity to:

provide, to the device, other information that indicates another network entity transmit beam of the one or more network entity transmit beams corresponding to another activated TCI state or another activated spatial relation configuration after a third delay from the obtainment of the report has elapsed; and switch to the indicated other network entity transmit beam to communicate the signals with the device.

26. The network entity of claim 25, wherein the second delay and the third delay are at least one of:

configured by the network entity; or based on a capability of the device.

27. The network entity of claim 25, wherein the report comprises at least one of:

a value of the second delay; or a value of the third delay.

28. A method of wireless communication at a network entity, comprising:

outputting a plurality of network entity transmit beams;

obtaining a report that indicates one or more transmission configuration indicator (TCI) states or one or more spatial relation configurations that are enabled independent of an activation command from the network entity and correspond to one or more network entity transmit beams of the plurality of network entity transmit beams for which one or more signal strengths is measured, wherein the report further comprises an indication of the one or more network entity transmit beams for which the one or more signal strengths is measured and an indication of one or more other network entity transmit beams of the plurality of network entity transmit beams for which one or more other signal strengths will be measured subsequent to the obtainment of the report; and activating, at the network entity, the one or more TCI states or the one or more spatial relation configurations that are enabled independent of the activation command from the network entity and correspond to the one or more network entity transmit beams.

29. The method of claim 28, further comprising:

providing, to a device, information indicating a network entity transmit beam of the one or more network entity transmit beams corresponding to a TCI state or a spatial relation configuration that is enabled independent of the activation command from the network entity; and switching to the indicated network entity transmit beam to communicate signals with the device.

30. The method of claim 29, wherein the report comprises at least one of:

the one or more signal strengths of the one or more network entity transmit beams; or an indication of one or more device receive beams corresponding to the one or more signal strengths.

31. A non-transitory computer-readable medium storing code at a device, the code comprising instructions executable by one or more processors to cause the device to:

measure, via one or more device receive beams, one or more signal strengths of one or more network entity transmit beams of a plurality of network entity transmit beams;

autonomously activate, at the device independent of obtaining an activation command, one or more transmission configuration indicator (TCI) states or one or more spatial relation configurations corresponding to the one or more network entity transmit beams based on the measured one or more signal strengths; and output a report that indicates the one or more TCI states or the one or more spatial relation configurations autonomously activated at the device independent of obtaining the activation command, wherein the report further comprises an indication of the one or more network entity transmit beams for which the one or more signal strengths is measured and an indication of one or more other network entity transmit beams of the plurality of network entity transmit beams, and wherein one or more other signal strengths of the one or more other network entity transmit beams will be measured subsequent to the output of the report.

32. A non-transitory computer-readable medium storing code at a device, the code comprising instructions executable by one or more processors to cause the network entity to:

output a plurality of network entity transmit beams;

obtain a report that indicates one or more transmission configuration indicator (TCI) states or one or more spatial relation configurations that are enabled independent of an activation command from the network entity and correspond to one or more network entity transmit beams of the plurality of network entity transmit beams for which one or more signal strengths is measured, wherein the report further comprises an indication of the one or more network entity transmit beams for which the one or more signal strengths is measured and an indication of one or more other network entity transmit beams of the plurality of network entity transmit beams for which one or more other signal strengths will be measured subsequent to the obtainment of the report; and activate, at the network entity, the one or more TCI states or the one or more spatial relation configurations that are enabled independent of the activation command from the network entity and correspond to the one or more network entity transmit beams.

* * * * *